US006243538B1

(12) United States Patent
Okuno

(10) Patent No.: US 6,243,538 B1
(45) Date of Patent: Jun. 5, 2001

(54) CAMERA AND APPARATUS ADAPTED TO USE A FILM CARTRIDGE

(75) Inventor: Ryoji Okuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,485

(22) Filed: Jul. 9, 1999

(30) Foreign Application Priority Data

Jul. 23, 1998 (JP) .................................................. 10-208098

(51) Int. Cl.⁷ .............................. G03B 17/24; G03B 19/02
(52) U.S. Cl. ............................................ 396/321; 396/390
(58) Field of Search ................................... 396/310, 311, 396/319, 320, 321, 390

(56) References Cited

U.S. PATENT DOCUMENTS

| 5,229,810 | * | 7/1993 | Cloutier et al. | 396/319 |
| 5,682,458 | * | 10/1997 | Funazaki | 396/319 |
| 5,768,640 | * | 6/1998 | Takahashi et al. | 396/310 |
| 5,913,078 | * | 6/1999 | Kimura et al. | 396/310 |
| 5,930,537 |   | 7/1999 | Okuno et al. | 396/281 |
| 5,995,768 | * | 11/1999 | Kitagawa et al. | 396/319 |
| 6,006,042 | * | 12/1999 | Saito et al. | 396/311 |

FOREIGN PATENT DOCUMENTS 9-244094   9/1997   (JP) .

* cited by examiner

Primary Examiner—David M. Gray
(74) Attorney, Agent, or Firm—Fitzpatrick, Cella, Harper & Scinto

(57) ABSTRACT

A camera for use with a film cartridge includes: an identification device for assigning individual identification information to a film cartridge loaded in the camera; a device for recording the individual identification information assigned by the identification device on one of the film cartridge and the film accommodated in the film cartridge; a device for storing the individual identification information and film use history information of the film accommodated in the film cartridge, such that the film use history information is identifiable based on the individual identification information; a device for detecting the individual identification information recorded on at least one of the film cartridge loaded in the camera and the film accommodated in the film cartridge; a device for reading out from the storage device film use history information corresponding to the individual identification information detected by the detecting device; and a device for controlling operation of the camera in accordance with the film use history information read out from the storing device by the reading device.

30 Claims, 20 Drawing Sheets

FIG. 6
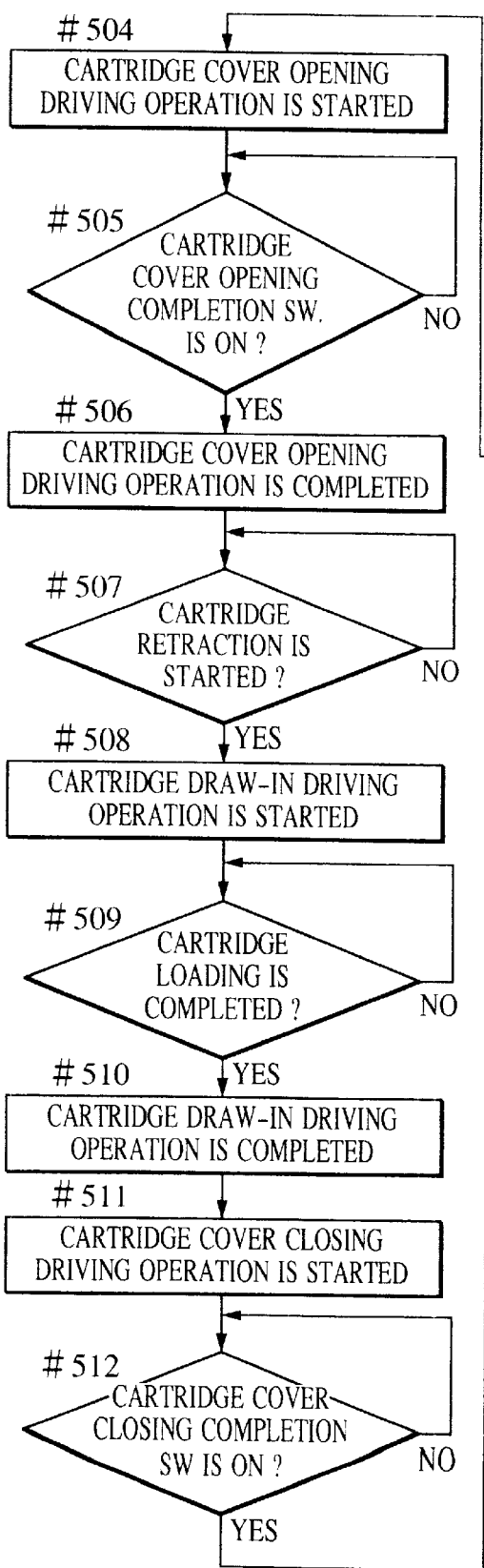
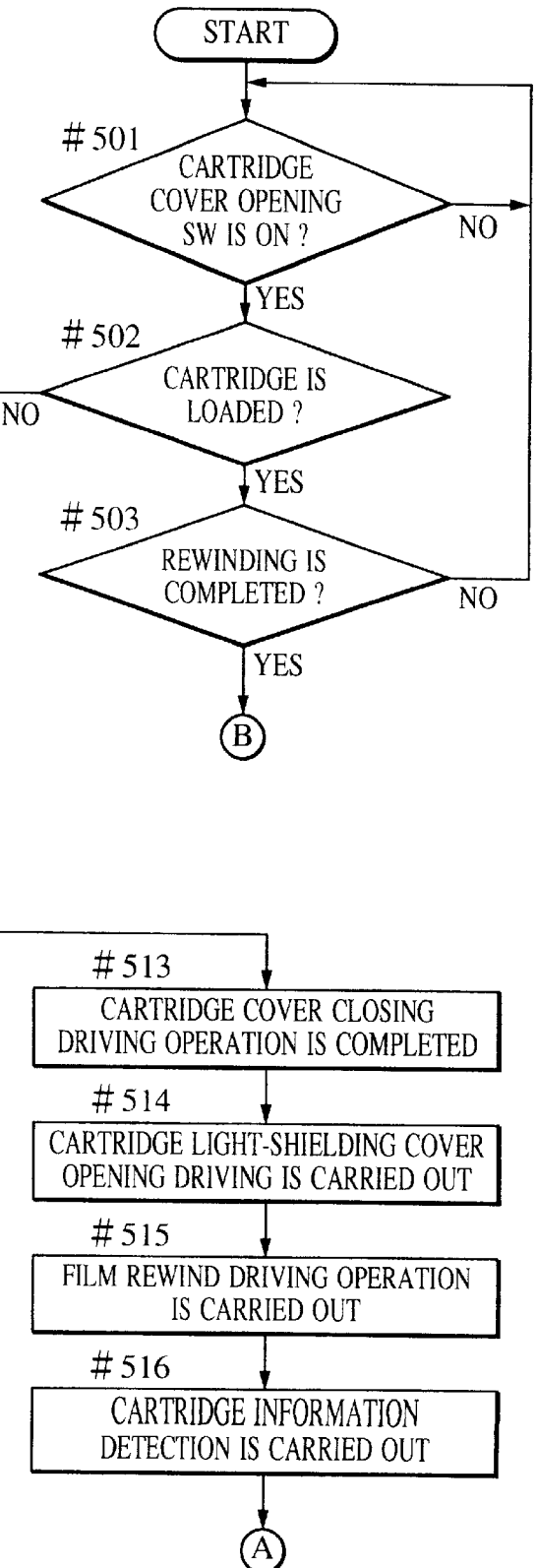

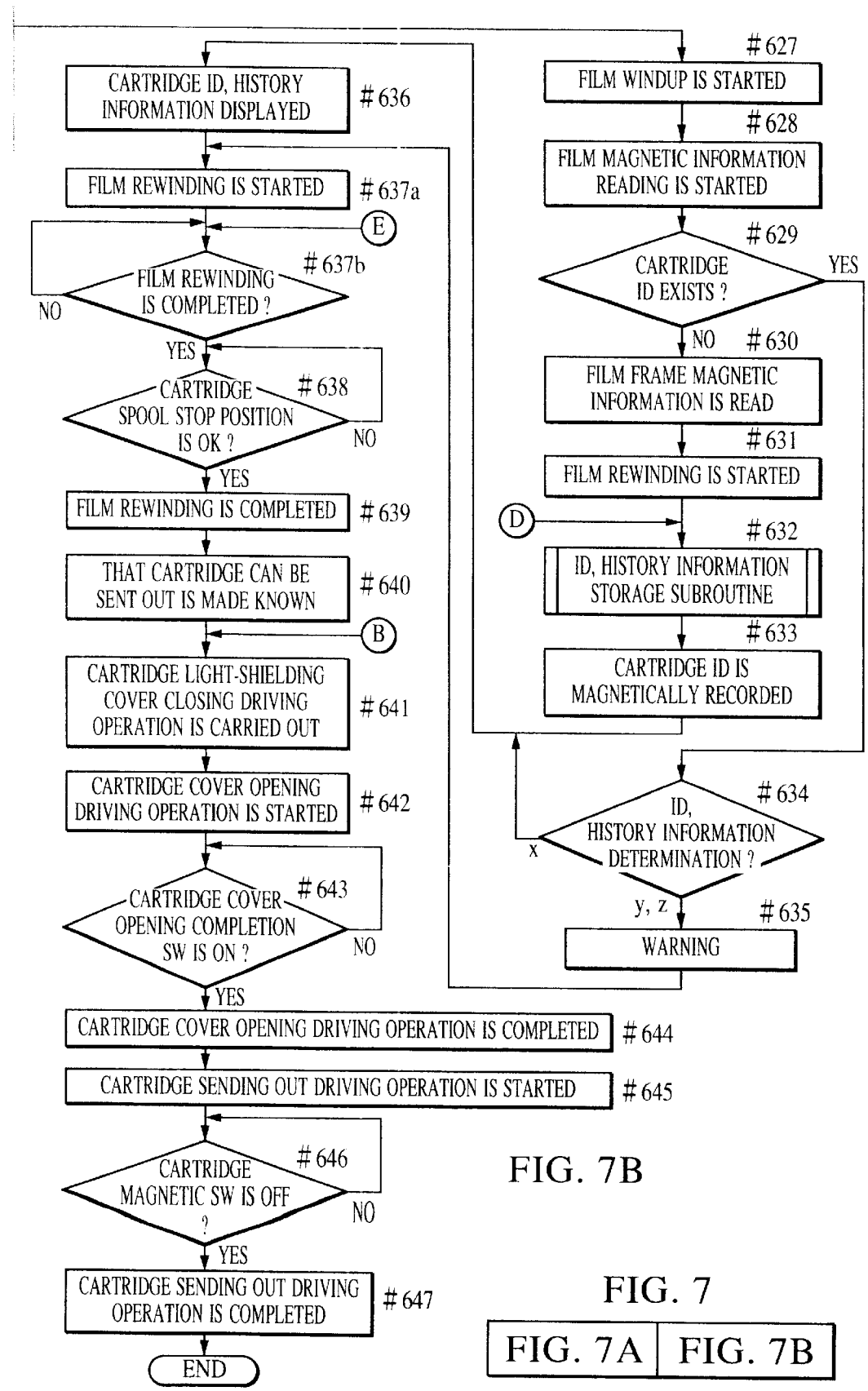

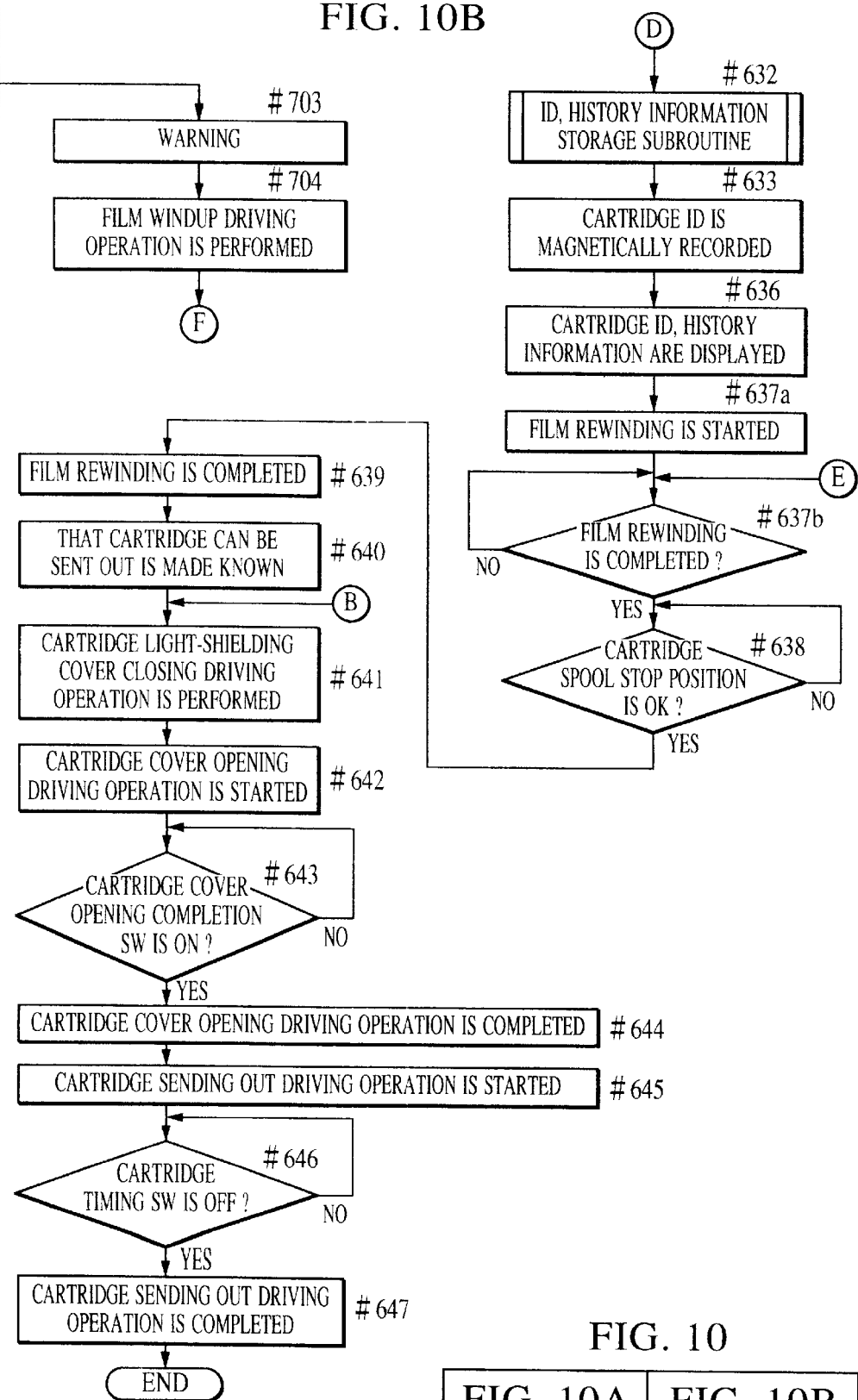

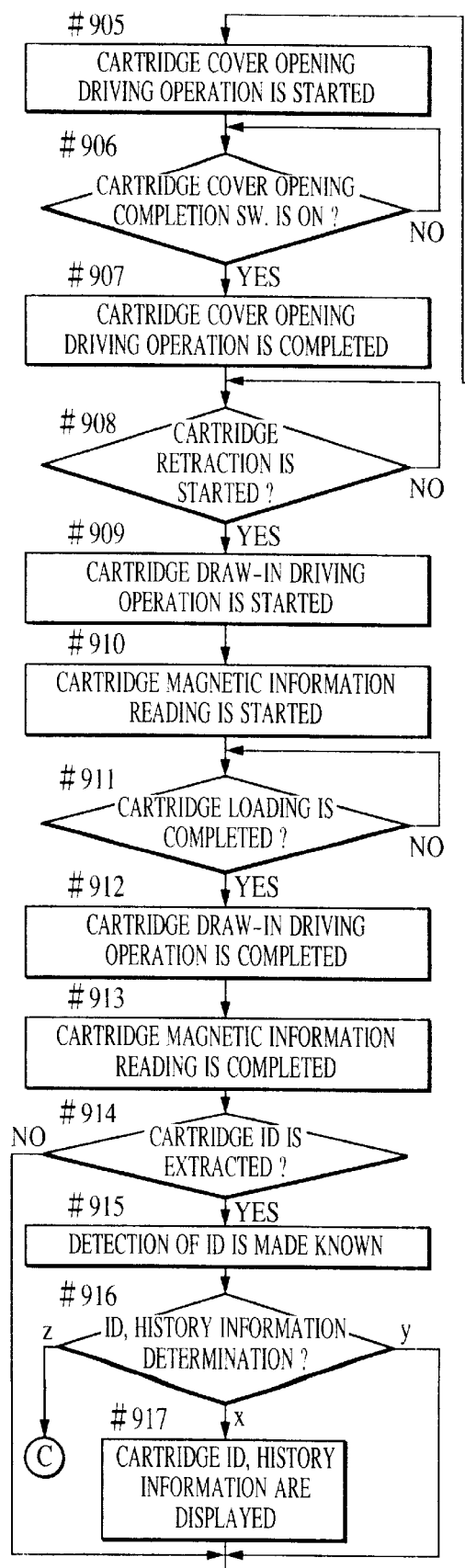
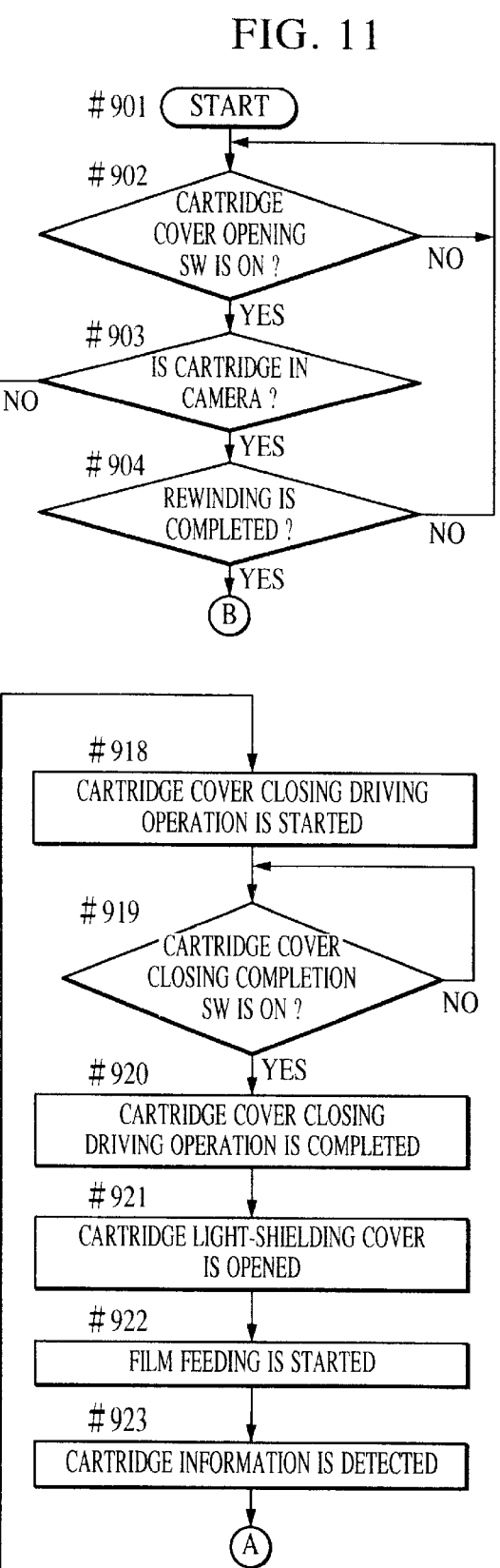
FIG. 11

| FIG. 12A | FIG. 12B |

CAMERA AND APPARATUS ADAPTED TO USE A FILM CARTRIDGE

BACKGROUND OF THE INVENTION

1. Field of the Invention

The present invention relates to an apparatus, such as a camera, adapted to use an image recording medium, such as a photographic film.

2. Description of the Related Art

In recent years, a new film cartridge has been proposed, in which film information, such as the state of use of a film housed in the cartridge, the film sensitivity, or the number of frames of film usable for photographic operations, are indicated at an exterior portion of the cartridge. When the state of use of the film is indicated, information regarding the exposure state (such as "no frames are exposed", "some frames are exposed", or "all frames are exposed") or information regarding whether or not the film has been subjected to development is provided.

When this new type of film cartridge is used in a camera, a film which has been only partly used can be removed and then reloaded to take additional photographs, starting from an unexposed frame. However, when there are several such cartridges including partly used films which have been removed from the camera, or when a long time has elapsed since the removal of a particular cartridge including a partly used film, the user cannot tell the film use history (such as what kind of photographs have been taken or the remaining number of frames of film that are usable for photography) from the information provided at the exterior portion of the cartridge.

In Japanese Patent Laid-Open No. 9-244094, when films which have been partly used are rewound in cartridges, individual identification numbers (unique ID numbers), marked on respective film cartridges at the time of manufacture, are automatically and optically read by a camera, or individual ID numbers and the remaining number of usable frames, corresponding to the ID numbers, are successively input manually and stored in a camera by the user. When some of the frames of a film housed in a cartridge loaded in a camera have been used, the camera optically and automatically reads the ID number of the associated film cartridge, or the user manually inputs the ID number of the associated film cartridge into the camera and compares it with a list of ID numbers previously stored in the camera. When the corresponding ID number is found in the list, the user can determine the remaining number of film frames stored in the camera by using the corresponding ID number. Therefore, the film can be automatically advanced so that photographic operations can be started from an unexposed frame.

SUMMARY OF THE INVENTION

Accordingly, it is an object of the present invention to provide an apparatus such as a camera, usable with a film cartridge and comprising:

a) identification means for assigning individual identification information to a film cartridge loaded in the camera;

b) means for recording the individual identification information assigned by the identification means on one of the film cartridge and the film accommodated in the film cartridge;

c) means for storing the individual identification information and corresponding film use history information of a film accommodated in a film cartridge, such that the film use history information is identifiable based on the individual identification information;

d) means for detecting the individual identification information recorded on at least one of the film cartridge loaded in the camera and the film accommodated in the film cartridge;

e) means for reading out from the storing means film use history information corresponding to the individual identification information detected by the detecting means; and f) means for controlling operation of the camera in accordance with the film use history information read out from the storing means by the reading means.

By virtue of this structure, even when the film cartridge itself does not have sufficient storage capacity, it is possible to carry out control operations based on the film use history of the film accommodated in the film cartridge.

BRIEF DESCRIPTION OF THE DRAWINGS

FIG. 6 is a flow chart illustrating the operational sequence of the camera of FIG. 1.

FIGS. 7, 7A and 7B are a flow chart illustrating the operational sequence of the camera of FIG. 1.

FIGS. 10 10A and 10B are a flow chart illustrating a modified operational sequence of the camera of FIG. 1.

FIG. 11 is a flow chart illustrating the operational sequence of a second embodiment of the camera in accordance with the present invention.

DESCRIPTION OF THE PREFERRED EMBODIMENTS

A description will now be given of preferred embodiments of the present invention with reference to the drawings.

FIRST EMBODIMENT

Figure 1:
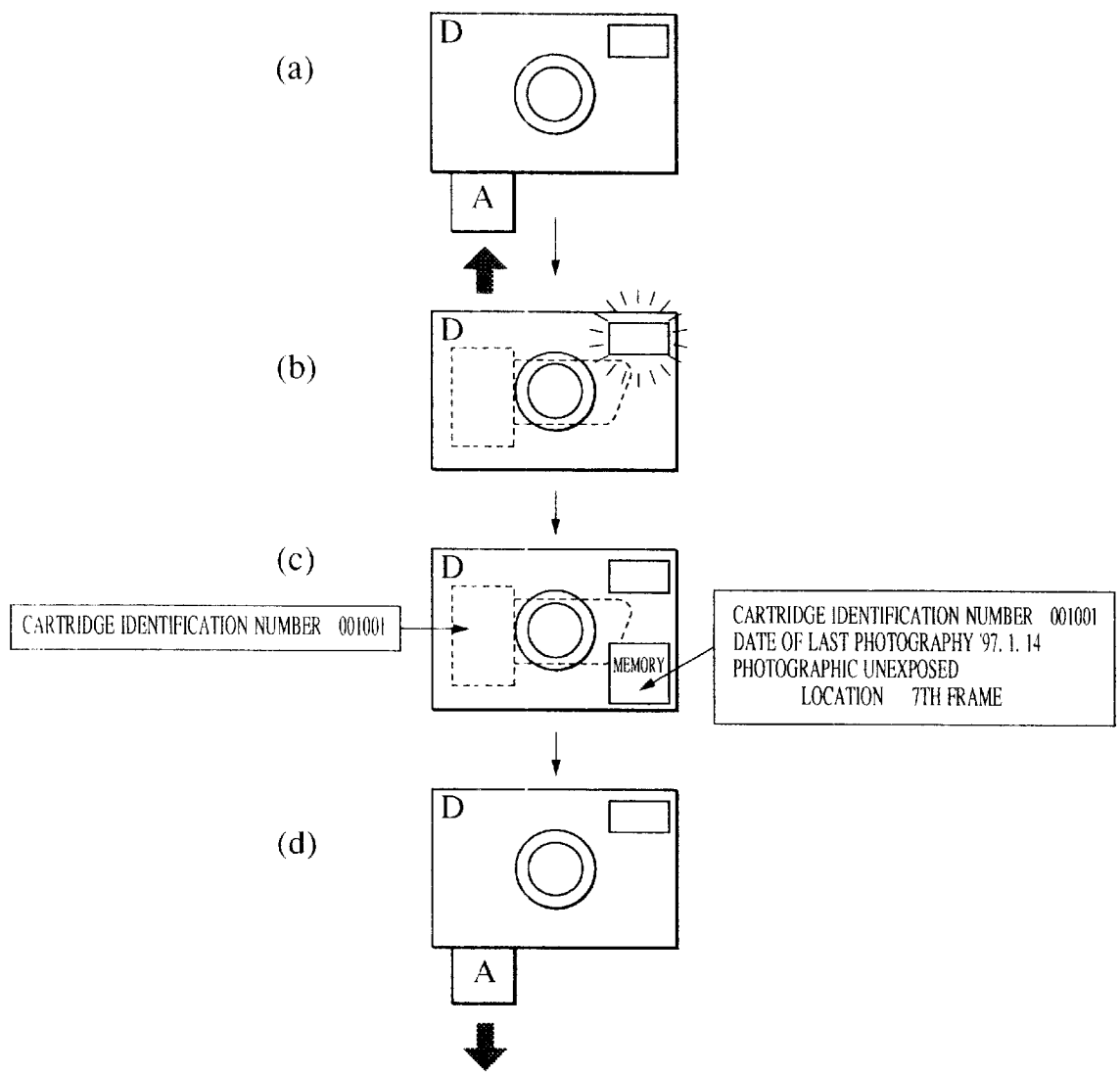
FIG. 1 is a schematic view of a first embodiment of the camera in accordance with the present invention.
Figure 2:
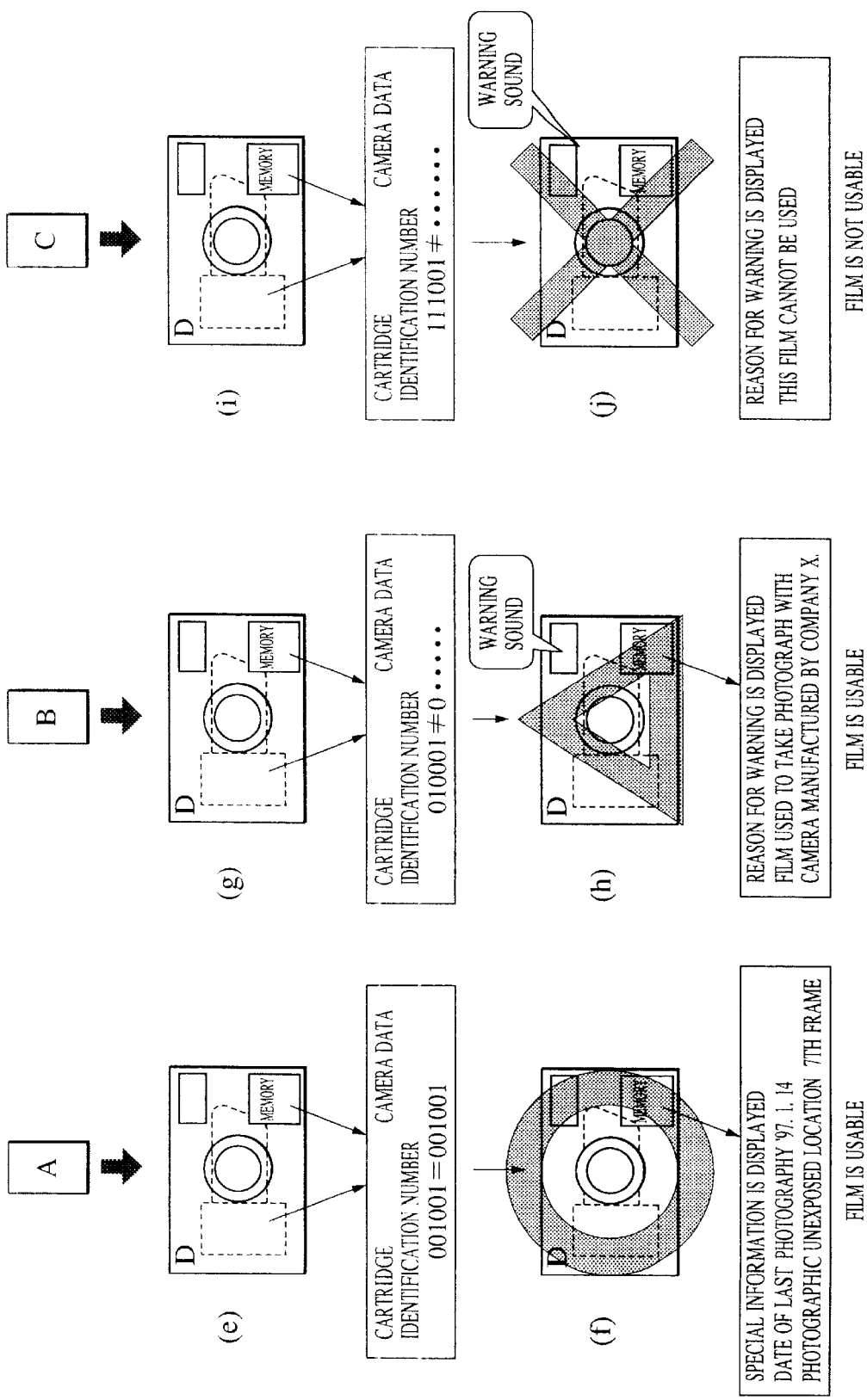
FIG. 2 is a schematic view of the camera of FIG. 1.

FIGS. 1 and 2 are schematic views of a first embodiment of a camera in accordance with the present invention.

In FIG. 1, an unused film cartridge is loaded into the camera. Then, the film is partly used and the film cartridge is removed from the camera.

More specifically, in FIG. 1(a), an unused film cartridge A is being loaded in a camera D. In FIG. 1(b), the loaded film cartridge A is being used to take photographs. Here, for each frame photographic information, such as the exposure state or the date of photography, is magnetically recorded on a corresponding film magnetic information recording section. In FIG. 1(c), the film, which has been partly used, is being rewound into the film cartridge. Here, a unique ID number (which is 001001 in FIG. 1(c)) is automatically assigned or issued by the camera D itself to identify the cartridge A, and is recorded in the film magnetic information recording section or in a magnetic information recording section provided on the exterior portion of the cartridge. The ID number is assigned by the camera itself: the person using the camera cannot assign it. The ID number, assigned by the camera D, is stored in a nonvolatile memory (corresponding to storing means MEMORY in FIG. 1(c)) incorporated in the camera D body. Film use history, such as the date of last photography (Jan. 14, 1997 in FIG. 1) or the remaining number of frames usable for photography (the seventh frame is usable in FIG. 1), also is stored in the aforementioned nonvolatile memory together with the ID number, such that this film use history is low identifiable by the ID number.

In a preferred embodiment, as shown in FIGS. 1 and 2, the ID number consists of six digits. Starting from the left, the first digit represents the manufacturer or the selling agent of the camera. The second digit indicates the model of the camera. The third digit indicates the lot number of the camera. The digits following the third digit indicate the cartridge classification number; cartridge classification numbers are assigned successively by the camera.

The film use history information is stored such that the date of last photography and the remaining number of frames of film usable for photography are stored each time a photograph is taken. This information is stored in the nonvolatile memory in association with respective ID numbers assigned by the camera when partly used films are rewound on respective film cartridges.

In FIG. 1(d), the film cartridge A, whose ID number has been recorded thereon, is being discharged from the camera D.

In FIGS. 2(e) and 2(f), a film cartridge including a partly used film, which previously was removed from the camera D, is being reloaded in the camera D.

In FIG. 2(e), the cartridge A is reloaded in the camera D. The ID number, recorded in the magnetic information recording section on the exterior portion of the loaded cartridge A or recorded on the magnetic information recording section of the film accommodated in film cartridge A is read in order to find out whether or not any of the ID numbers stored in the nonvolatile memory in the camera D is identical to the ID number of the cartridge A. In this case, an ID number which is identical to the ID number (001001) of the cartridge A is found among the ID numbers stored in the nonvolatile memory in the camera D. The film use history information corresponding to the ID number of the cartridge A is read from the nonvolatile memory, and displayed in display means of the camera, e.g., the viewfinder or an external window display.

In FIG. 2(f), the corresponding film use history is displayed. Here, the camera can be used to take additional photographs.

In FIGS. 2(g) and 2(h), a film cartridge B, removed after being only partly used from a camera different from the camera D but being produced by the same manufacturer, is loaded in the camera D.

In FIG. 2(g), the cartridge B is shown as being loaded in the camera D. As in FIGS. 2(e) and 2(f), the ID number, recorded in the magnetic information recording section on the exterior portion of the loaded cartridge A or recorded on the magnetic information recording section of the film accommodated in the film cartridge B is read in order to find out whether or not any of the ID numbers stored in the nonvolatile member in the camera D is identical to the ID number of the cartridge A. In this case, an ID number which is identical to the cartridge B is not found among the ID numbers stored in the nonvolatile memory in the camera D. However, the first digit of the ID number of the cartridge B represents the manufacturer of a camera identical to that of the ID number of the cartridge A indicating the manufacturer of the camera D. This shows that the film cartridge B was used to take photographs by a camera produced by the same manufacturer.

In FIG. 2(h), the camera user is warned that an ID number identical to the ID number of the cartridge B was not found, and the following is an example of what may be displayed: "The film has been used to take photographs in a camera produced by the same manufacturer as the camera D." In this case, the user can take additional photographs using cartridge B with the camera D because when cameras produced by the same manufacturer are used, the precision of magnetic recording operations can be ensured, making it possible to reliably reproduce magnetic information even when highdensity magnetic recording is carried out.

In FIGS. 2(i) and 2(j), a film cartridge C, removed after being partly used from a camera produced by a manufacturer different from that of the camera D, is loaded in the camera D.

In FIG. 2(i), the cartridge C is loaded in the camera D. As in FIGS. 2(e) to 2(h), the ID number recorded in the magnetic information recording section on the exterior portion of the loaded cartridge C or recorded on the magnetic information recording section of the film accommodated in the film cartridge C is read in order to find out whether or not any of the ID numbers stored in the nonvolatile member in the camera D is identical to the ID number of the cartridge C. In this case, an ID number which is identical to that of the cartridge C is not found among the ID numbers stored in the nonvolatile memory in the camera D. The first digit of the ID number of the cartridge C representing the manufacturer of a camera is not identical to the first digit of the ID number of the cartridge A indicating the manufacturer of the camera D. This means that the film was used to take photographs by a camera produced by a different manufacturer.

In FIG. 2(j), the camera user is warned that an identical ID number was not found, and the following is an example of what may be displayed: "This film cannot be used." In this case, the camera cannot be used to take additional photographs using the cartridge D. This obviates problems arising from the use of film cartridges in cameras of different manufacturers where precise magnetic recording cannot be ensured.

Figure 3:
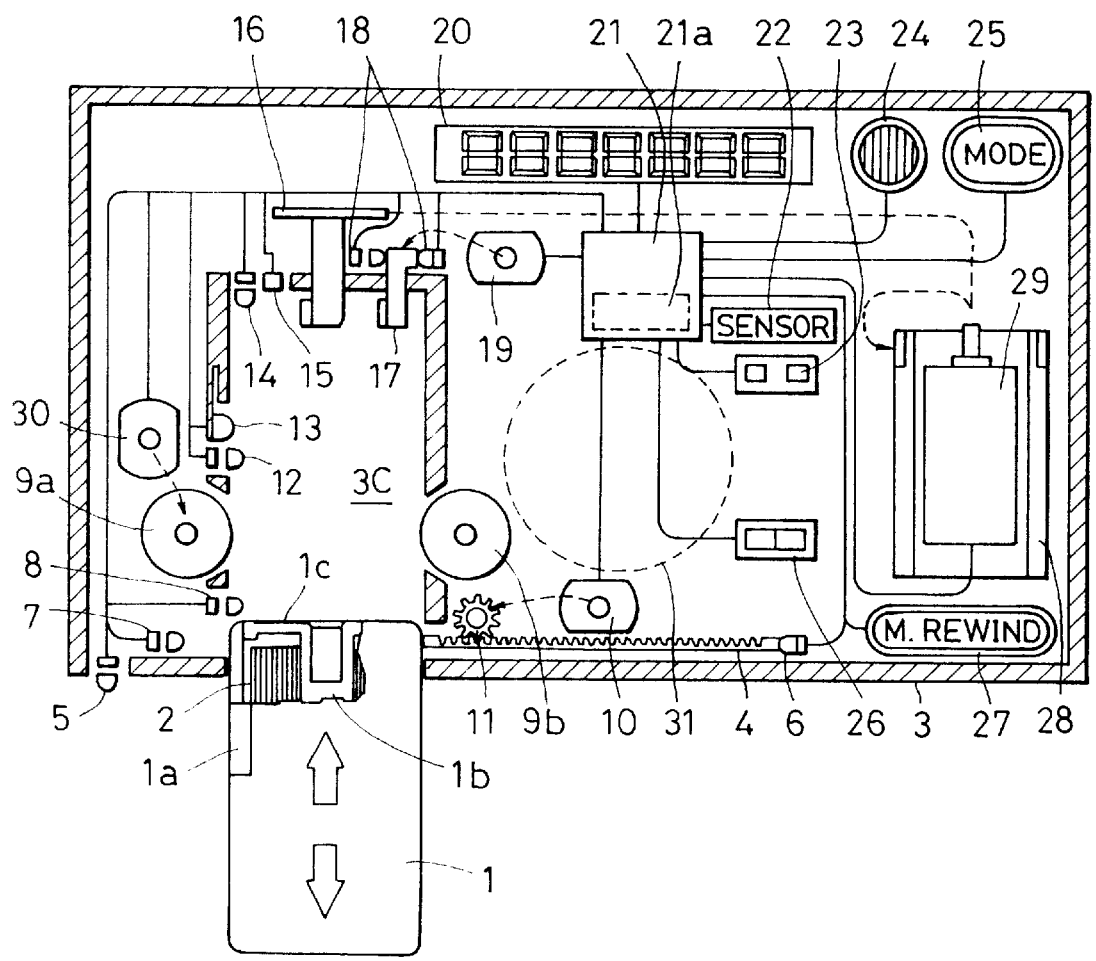
FIG. 3 is a sectional view of the camera of FIG. 1.

FIG. 3 illustrates in more detail the structure of the camera of FIGS. 1 and 2. In FIG. 3, reference numeral 1 denotes a film cartridge. A photographic film 2 with a magnetic recording section is wound up on a cartridge shaft 1b. A magnetic recording section 1a is provided on an exterior portion of the cartridge 1. A flange portion 1c is provided at an end of the cartridge 1 where cartridge information (such as specifications of the photographic film 2 including the remaining number of frames usable for photography, the ISO sensitivity, or whether the film type is a negative or positive film) is indicated with bar codes. The position of the flange portion 1c when the photographic film 2 is wound in the cartridge 1 (or when the photographic film 2 is in an initial state) also indicates the state of use of the film 2 (that is, whether film 2 is an unused film, or a partly used film, or a completely used film, or whether film 2 has been subjected to development).

Reference numeral 3 denotes a camera body. Reference numeral 4 denotes a cartridge cover that opens and closes with respect to a cartridge loading chamber 3C. Reference numeral 5 denotes a cartridge chamber cover opening operation switch. Reference numeral 6 denotes a cartridge chamber cover opening detection switch. Reference numeral 7 denotes a cartridge chamber cover closing detection switch. Reference numeral 10 denotes a cartridge chamber cover driving motor for opening and closing the cartridge chamber cover 4 by driving operations. The cartridge chamber cover driving motor 10 is controlled by a control circuit 21 formed by a microcomputer or the like, and transmits power to a cartridge chamber cover drive gear 11 through a gear train (not shown).

Reference numeral 8 denotes a cartridge draw-in start switch used to start drawing in the cartridge 1 towards the cartridge chamber 3C, and reference numeral 30 denotes a cartridge loading motor used to cause the cartridge 1 to move into and out of the cartridge chamber 3C.

Reference numeral 9a denotes a cartridge loading roller to which the power from the motor 30 is transmitted through a gear train (not shown), and reference numeral 9b denotes a cartridge loading driven roller. The cartridge 1 is placed between these rollers 9a and 9b in order to move the cartridge 1 into and out of the cartridge chamber 3C.

Reference numeral 12 denotes a cartridge magnetic information timing switch used to detect the timing of starting the reading out of the magnetic information written on the magnetic recording section la provided on the exterior portion of the cartridge 1. Reference numeral 13 denotes a cartridge magnetic head used to write (record) magnetic information on the magnetic recording section 1a, or to read (reproduce) magnetic information recorded on the magnetic recording section 1a. Reference numeral 14 denotes a cartridge loading completion detection switch.

Reference numeral 15 denotes a cartridge information read sensor for reading the bar code information at the flange portion 1c or the state of use of the loaded film in order to transmit the read information to the control circuit 21. Reference numeral 16 denotes a fork gear which engages the cartridge shaft 1b in order to advance or rewind the film 2 from or into the cartridge 1. Power from a film feed motor 29 is transmitted to the fork gear 16 through a gear train (not shown). The film 2, supplied from the cartridge 1, passes through the interior of the camera, and is wound up by a spool 28 driven by the feed motor 29.

Reference numeral 17 denotes a driver of a cartridge light-shielding cover (not shown) for shielding the opening in the cartridge 1 where the film moves into and out of the cartridge 1. The cartridge light-shielding cover is opened and closed by the drive power of the driver motor 19. Reference numeral 18 denotes an opening and closing position detection switch for detecting the position of the driver 17, that is, for detecting the opening and closing of the cartridge light-shielding cover.

Reference numeral 20 denotes a liquid crystal display section controlled by the control circuit 21. Reference numeral 21a denotes a nonvolatile memory incorporated in the control circuit 21. Reference numeral 22 denotes sensors (such as a thermometer, a position detection device (including GPS), or a timepiece) for obtaining information useful in determining photographic conditions. Reference numeral 23 denotes a film position detection sensor for detecting the position of a film that has been fed.

Reference numeral 24 denotes a sound generating member for giving a warning to a user when abnormal camera operations are carried out. Reference numeral 25 denotes a mode change-over switch for selecting the film use history information, stored in the memory 21a, of the film used to take photographs.

Reference numeral 26 denotes a magnetic head for recording information in the magnetic recording section of the film 2 and for reproducing information recorded thereon. Reference numeral 27 denotes a forced rewind switch. Reference numeral 31 denotes a photography section for exposing a film. The photography section is formed by a photographic lens barrel, a lens barrel drive mechanism (not shown), a shutter drive mechanism, an exposure switch, etc.

Figure 4:
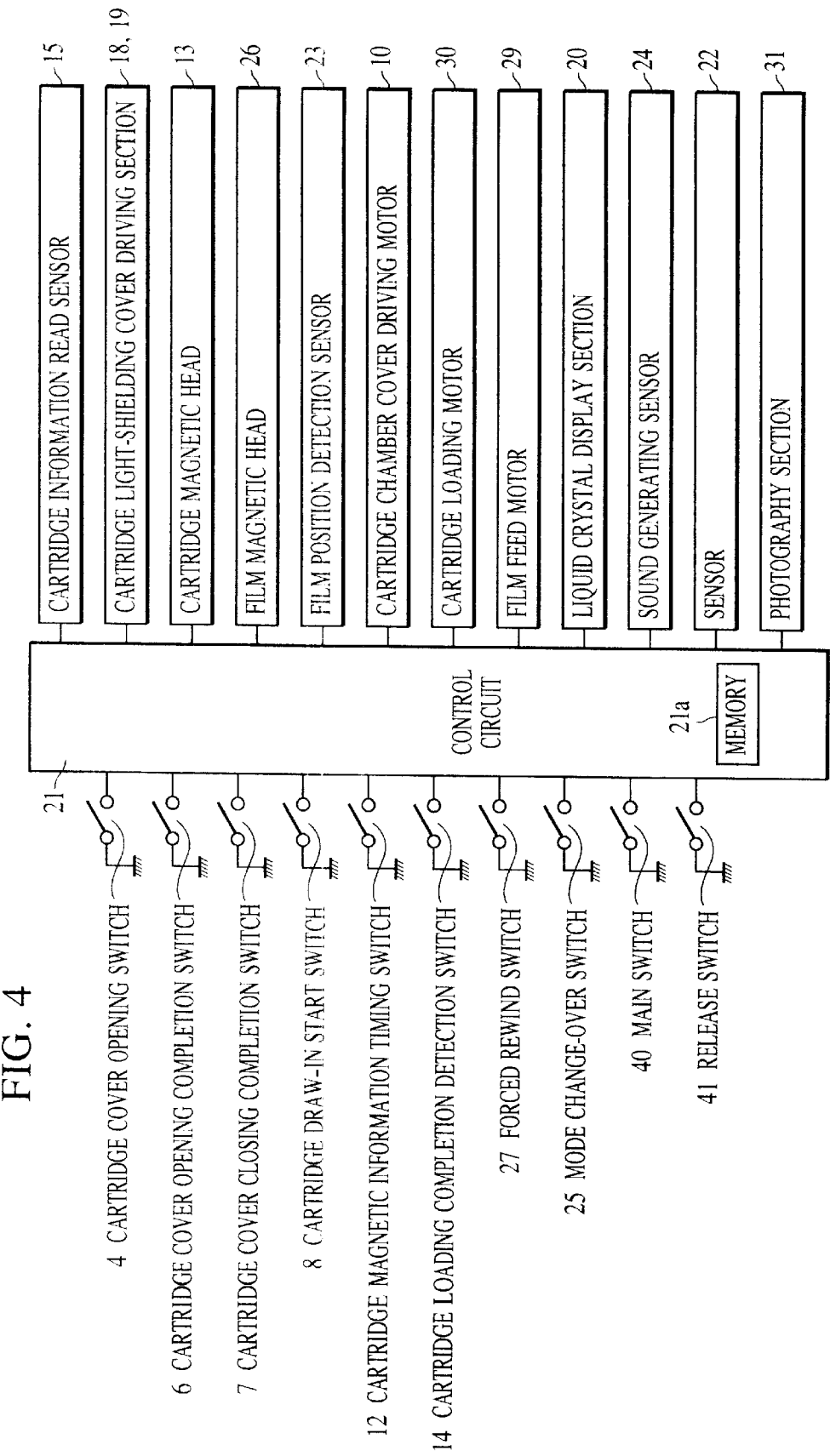
FIG. 4 is a block diagram of the electrical circuit in the camera of FIG. 1.

FIG. 4 schematically illustrates an electrical circuit of the above-described camera. The aforementioned switches, sensors, motors, etc., are connected to the control circuit 21. Reference numeral 40 denotes a main switch for setting the control circuit 21 in an operating state. Reference numeral 41 denotes a release switch used to carry out exposure operations. The main switch 40 and the release switch 41 are also connected to the control circuit 21.

Figure 5:
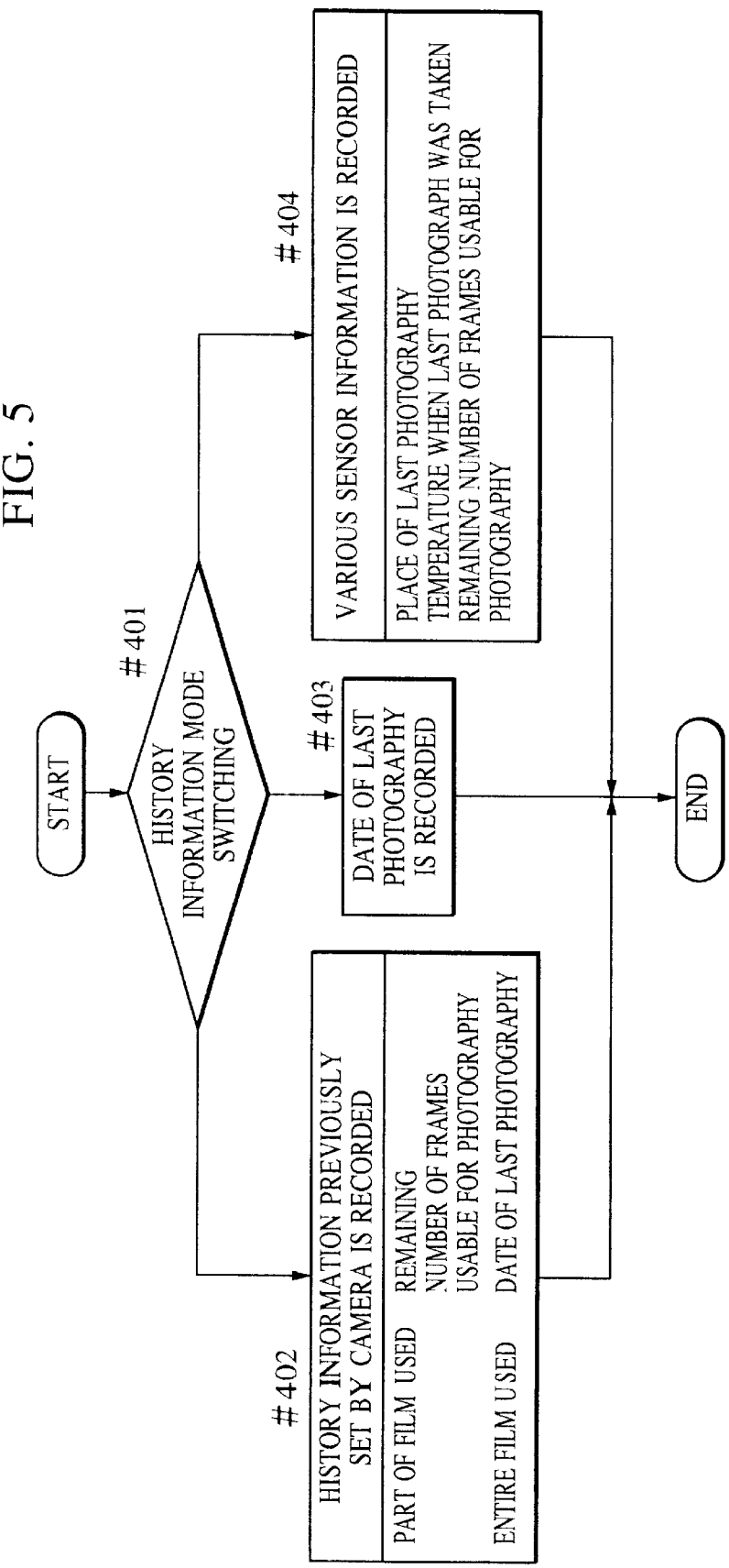
FIG. 5 is a flow chart illustrating the mode changeover sequence in the camera of FIG. 1.

FIG. 5 illustrates the mode change-over sequence executed by the control circuit 21 in order to determine the type or types of film use history information to be stored in the memory 21a. In other words, this control sequence is executed to determine the way in which a cartridge loaded in a camera is identified for the camera user, who can determine the identity by using the film use history information previously set by the camera or film use history information arbitrarily set by the camera user.

Various types of film use history information may be stored in the memory 21a in order to instantly display them for camera users as a result of instantly calling them out based on the ID number of a cartridge recorded in either the magnetic recording section on the exterior portion of the cartridge or the magnetic recording section formed on the film reader portion. The type or types of film use history information among camera users want to know during cartridge loading varies among camera users. Therefore, the camera of the present invention is designed to allow selection of the desired type or types of film use history information stored in the memory 21a.

In FIG. 5, when the mode change-over switch 25 is pressed once within a predetermined length of time in Step 401, the camera is set in a mode which allows the type or types of film use history information previously set by the camera to be stored in the memory 21a in Step 402. More specifically, the camera is set in a mode which allows the film use history information previously set by the camera to be stored in the memory 21a in accordance with the state of use of the film (that is, in accordance with whether or not the film is an unused film, a partly used film, a completely used film, or a film which has been subjected to development) detected by the cartridge information read sensor 15. In general, for a new film which has not been used, it is not necessary to store film use history information. For a partly used film, instantly knowing the remaining number of frames usable for photography or other film use history information is convenient for the next photographic operations. Therefore, the remaining number of frames usable for photography is stored. For a completely used film or a film which has been subjected to development, knowing the date of last photography allows the camera user to know the place of photography. It also makes it easier for the user to decide where he or she should go for film development, or to arrange cartridges in an orderly manner. Therefore, the date of last photography is stored in the memory 21a.

When the mode change-over switch 25 is pressed two or three times within a predetermined length of time in Step 401, the camera is set in a mode which allows the camera user to select at least one type of film use history information helpful in finding out about the film and to store the selected information type in the memory 21a in Steps 403 and 404. More specifically, the camera is set in a mode allowing storage of the last date of photography (in Step 403), or allowing storage of the place of last photography detected by the GPS sensor, or the temperature of the last photographed location, both of which are detected by the GPS sensor, in the memory 21a (in Step 404). Accordingly, the camera of the present invention allows the camera user to know about the film, from the film use history information previously set by the camera, or by allowing him or her to select film use history information type or types of his or her choice.

FIGS. 6 and 7 illustrate the sequence of all of the camera operations executed by means of the control circuit 21. In the mode change-over sequence, in which the type or types of film use history information are determined, the camera is set in either one of the two modes at the time of shipment at the plant. The camera mode can be changed by an interrupt operation during the camera operations illustrated in FIGS. 6 and 7.

In the camera operation sequence of FIGS. 6 and 7, an ID number is recorded in the magnetic recording section of the film 2. For an unused film cartridge, storage of an ID number in the magnetic recording section of the film and storage of an ID number and corresponding film use history information in the memory 21a are not performed. For a partly used film, a completely used film, or a film subjected to development, storage of an ID number in the magnetic recording section of the film or storage of an ID number and corresponding film use history information in the memory 21a are performed, making it easier to identify the cartridge.

Films housed in cartridges have an inherent problem in that their state of photographic use cannot be easily determined from inspection of the external portion of the cartridges. In order to overcome this serious problem, an ID information confirmation system is implemented for a used film cartridge and a film cartridge whose film has been subjected to development, instead of making them unusable as in ordinary cameras.

Each film cartridge which has been used can be identified by the camera of the present invention without using a special device. Therefore, for film cartridges whose ID numbers are stored in the camera, film use history information thereof is displayed. On the other hand, for film cartridges whose ID numbers are not stored in the camera, new ID numbers are given to these film cartridges and corresponding film use history information are recorded in the memory 21a.

In the flowcharts of FIGS. 6 and 7, capital letters A to E are used to indicate the next series of steps to be carried out. For example, when capital letter A in the sequence is reached, the next series of steps marked by the capital letter A is carried out.

In FIG. 6, when, in Step 501, the user presses the cartridge chamber cover opening operation switch 5 in order to load a cartridge 1 into the camera, and it is determined that no other cartridge is loaded in the camera in Step 502, the cartridge chamber cover drive motor 10 is driven by the control circuit 21 in order to start opening the cartridge chamber cover 4, by the driving operation, in Step 504. When the cartridge chamber cover 4 is completely opened, and the cartridge chamber opening detection switch 6 is pressed in Step 505, the driving of the cartridge chamber cover drive motor 10 is stopped in Step 506.

When the cartridge 1 is loaded into the cartridge chamber 3C, and the draw-in start switch 8 is pressed in Step 507, the cartridge loading motor 30 is driven in order to start drawing in the cartridge 1, placed between the rollers 9a and 9b, by the driving operation, in Step 508.

When the front end of the cartridge 1 in the loading direction, which has been drawn into the camera, presses the loading completion switch 14 in Step 509, the draw-in operation of the cartridge 1 is completed in Step 510.

When, in order to close the cartridge chamber cover 4, the cartridge chamber cover drive motor 10 is driven once again in Step 511, and the cartridge chamber cover 4 presses the closing completion switch 5 in Step 512, the cartridge chamber cover 4 is closed, and the drive motor 10 stops driving in Step 513.

When the cartridge use information represented by bar codes at the flange portion 1c is to be read by the sensor 15, the cartridge light-shielding cover drive motor 19 is driven, causing the cartridge light-shielding cover, provided at the cartridge 1 opening where the film moves into and out of the cartridge 1, to rotate and open in Step 514. When the cartridge light-shielding cover is completely opened, and the feed motor 29 is driven to rotate the fork gear 16, the film 2 is rewound, by the driving operation, in Step 515, in order to read the information of the state of use of the cartridge in Step 516.

When, in Step 502, the cartridge is loaded in the camera, a confirmation is made as to whether or not the film is rewound in Step 503 in order to proceed to Step 641. Step 641 is described later.

When, in Step 516, the cartridge use information is read out, the state of use of the film can be determined in Step 601 based on this information.

Figure 7A:
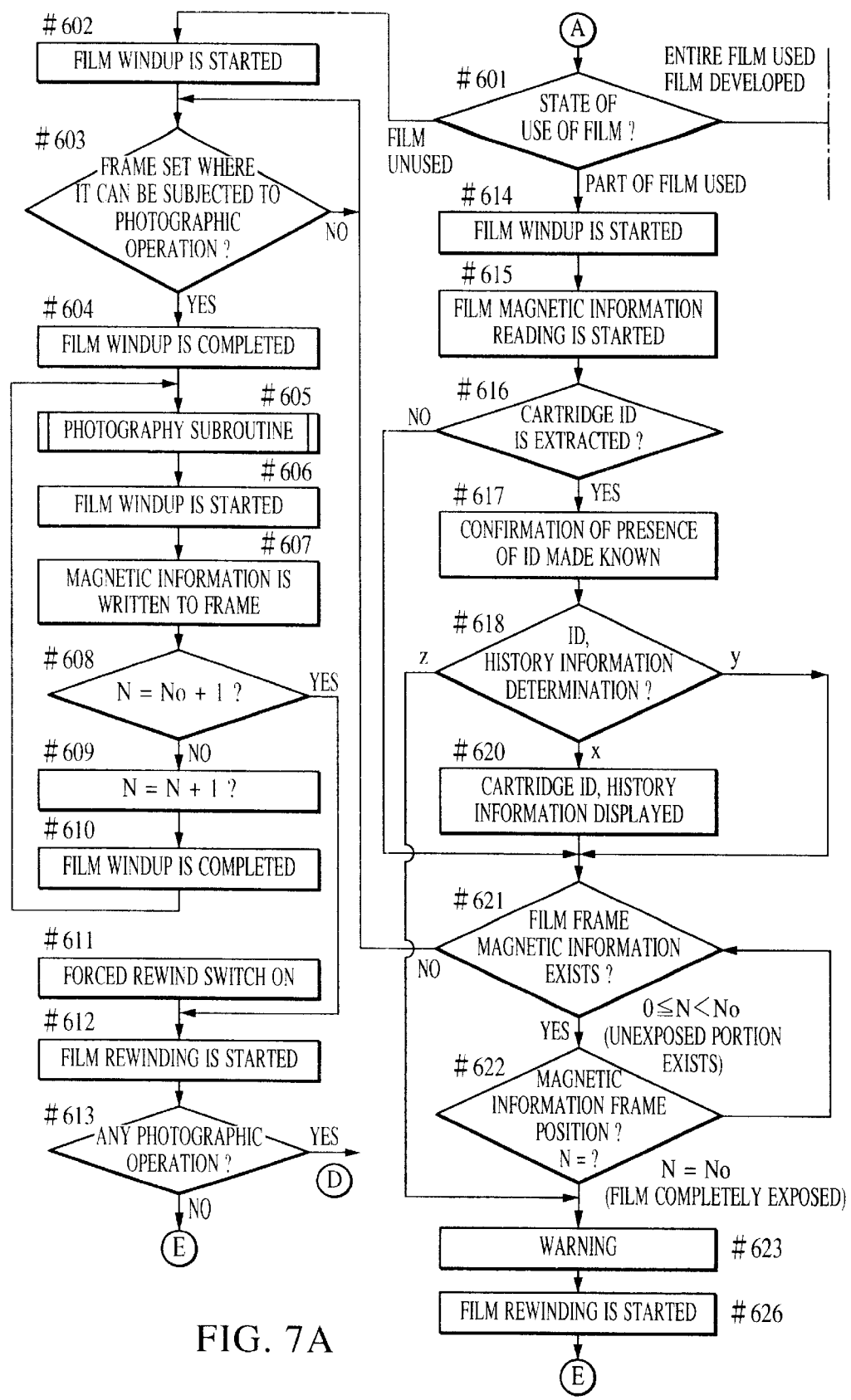

Referring now to FIG. 7A, in Step 601, when the film is an unused film, the feed motor 29 is driven to supply and wind up the film 2, whereby the film 2 is wound upon the spool 28 in Step 602. Then, in Step 603, when the position detection sensor 23 detects that the first frame of the film 2 has been moved to a position where it can be used to take a photograph, the winding up of the film is stopped in Step 604 in order to proceed to Step 605 in which a photographic subroutine is executed to expose the film.

In the photographic subroutine, various photographic operations, such as releasing operations, distance measurements, focusing operations, and shutter driving operations, are carried out at the photographic section 31 of FIGS. 3 and 4. After executing the photographic subroutine, the operation proceeds to Step 606 in order to wind up the film by the driving operation. Then, the film is advanced so that the next frame is set, and the information regarding the frame used for photography is magnetically written by the magnetic head 26 in Step 607.

When the frame count number N is less than a specified usable frame count number No, that is, when photographs can still be taken in Step 608, the sensor 23 detects that the advancement of the next frame to the location where a photograph can be taken, in order to add one to the frame count number N in Step 609. Thereafter, in Step 610, the feeding of the film is completed, and the user waits for photographic operations to be executed.

On the other hand, when, in Step 608, the frame count number N exceeds the specified usable frame count number, that is, when the film has been completely used, the feed motor 29 is driven to start rewinding the film 2 in Step 612.

By pressing the forced rewinding switch 27 during, for example, photographic operation standby, in Step 611, the rewinding of the film 2 in Step 612 can also be carried out. When, in Step 613, the loaded cartridge 1 has been used to take photographs at least once, the operation proceeds to Step 632 in order to execute an ID/film use history information storage subroutine (FIG. 7B). In the storage subroutine, the film use history information, selected by executing the mode change-over operation illustrated in FIG. 5, and the ID number (consisting of, for example, 6 digits, as in FIGS. 1 and 2) issued by the camera are stored in the nonvolatile memory 21a.

Figure 8A:
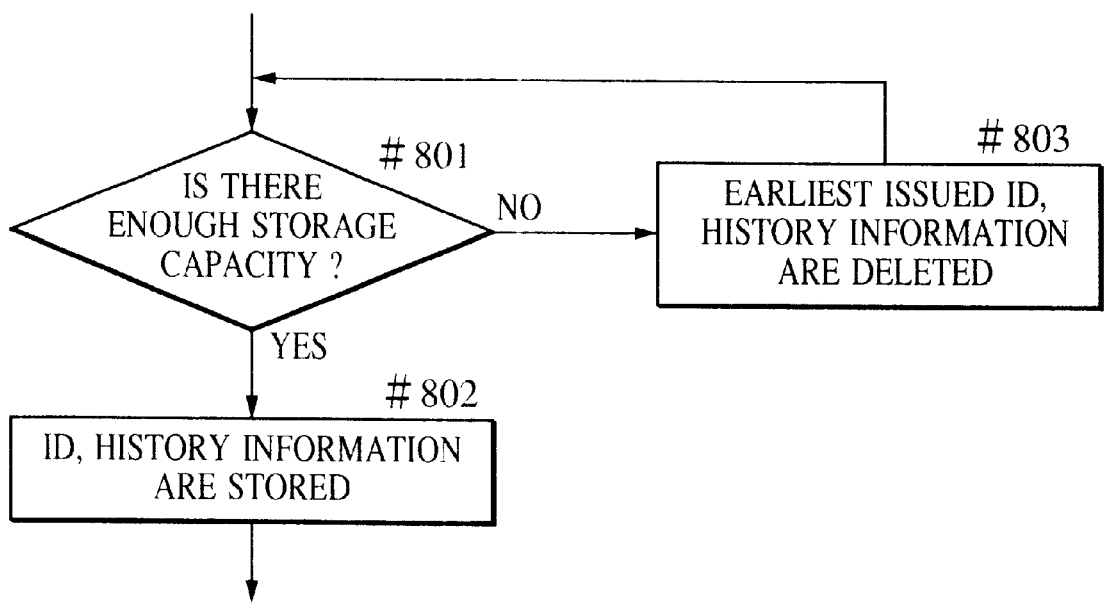
FIGS. 8A and 8B are a flow chart illustrating the ID number and the film use history storage sequence in the camera of FIG. 1.
Figure 8B:
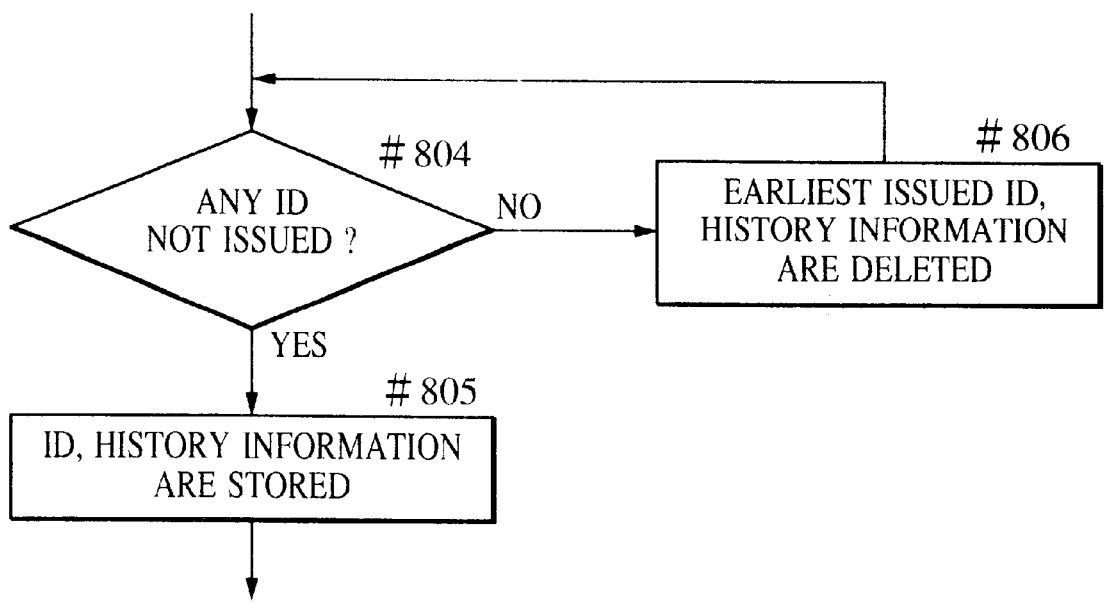

FIGS. 8A and 8B illustrate two alternative ID/film use history information storage subroutines that may be executed in Step 632. In the subroutine of FIG. 8A, a detection is made as to whether or not the memory 21a has enough storage capacity for storing an additional ID number or film use history information, in Step 801. If there is enough storage capacity, the new ID number is stored along with the film use history information in the memory 21a in Step 802. If there is not enough storage capacity, the earliest issued ID number and all of or some of the pieces of film use history information stored in the memory 21a are deleted in Step 803. Then, in Step 801, the storage capacity of the memory 21a is checked once again. When there is still not enough storage capacity, the earlier issued ID numbers and some or all of the related pieces of film use history information are successively deleted until there is enough storage capacity. When there is enough storage capacity, a new ID number is issued, and stored along with the related film use history information in the memory 21a, and the subroutine is exited.

The subroutine of FIG. 8B is used when there is a limit as to the number of ID numbers that can be issued by the camera. In this subroutine, a determination is made, in Step 804, as to whether or not there is an available new ID number which can be issued, that is, whether or not any of the ID numbers previously stored in the memory 21a is identical to the ID number to be issued. If there is no available ID number which can be issued, the earliest issued ID number and the related film use history information are deleted from the memory 21a in Step 806. Then, the deleted ID number is used to issue a new ID number in order to store it and the related film use history information in the memory 21a in Step 805. When, in Step 804, a new ID number can be issued, the new ID number is issued, and is stored along with the related film use history information in the memory 21a in Step 805, and the subroutine is exited.

When the ID/film use history information storage subroutine is completed, the operation proceeds to Step 633 in which the magnetic head 26 magnetically records the issued ID number in the magnetic recording section of the reader portion of the film 2 being rewound. Then, in Step 636, the ID number and the film use history information, stored in the memory 21a, are displayed on the liquid crystal display section 20.

When the rewinding of the film 2 is completed in Step 637b, the flange portion 1c of the cartridge 1 is stopped at a predetermined location by the cartridge information read sensor 15 in order to find out, in Steps 638 and 639, the state of use of the film (that is, to find out whether or not the film is an unused film, a partly used film, a completely used film, or a film which has been subjected to development). To make known to the user that the cartridge 1 can be moved out from the camera, the sound-generating member 24 generates a sound or the liquid crystal display section informs the user that the cartridge 1 can be moved out, in Step 640. When, in Step 641, the motor 19 is driven to close the cartridge light-shielding cover, the motor 10 is driven to start opening the cartridge chamber cover 4, by the driving operation, in Step 642.

When the cartridge chamber cover 4 is opened, and the cartridge chamber cover opening detection switch 6 is pressed in Step 643, the opening of the cartridge chamber cover 4, by the driving operation, is completed in Step 644. When, in Step 645, the cartridge 1 is moved out by driving the motor 30, and the exterior portion of the cartridge 1 stops pressing the timing switch 12 in Step 646, the moving out of the cartridge 1, by the driving operation, is completed in Step 647.

When, in Step 613, the loaded unused cartridge has not been used to take photographs, the operation proceeds to Step 637b and the aforementioned subsequent operations are executed, without issuing an ID number, storing an ID number and related film use history information in the memory 21a, and writing an ID number in the magnetic recording section of the film 2.

When, in Step 601, the film 2 is a partly used film, the operation proceeds to Step 614 to wind up the film by the driving operation. Then, the magnetic head 26 reads the ID number, recorded in the magnetic recording section of the film 2, in Step 615. In Step 616, the readout cartridge ID number is checked. When the checking of the ID number is completed, the sound-generating member 24 generates a sound in Step 617 in order to make known to the user that the existence of the ID number has been confirmed. The operation then proceeds to Step 618 to execute the ID number/film use history information sequence.

Figure 9:
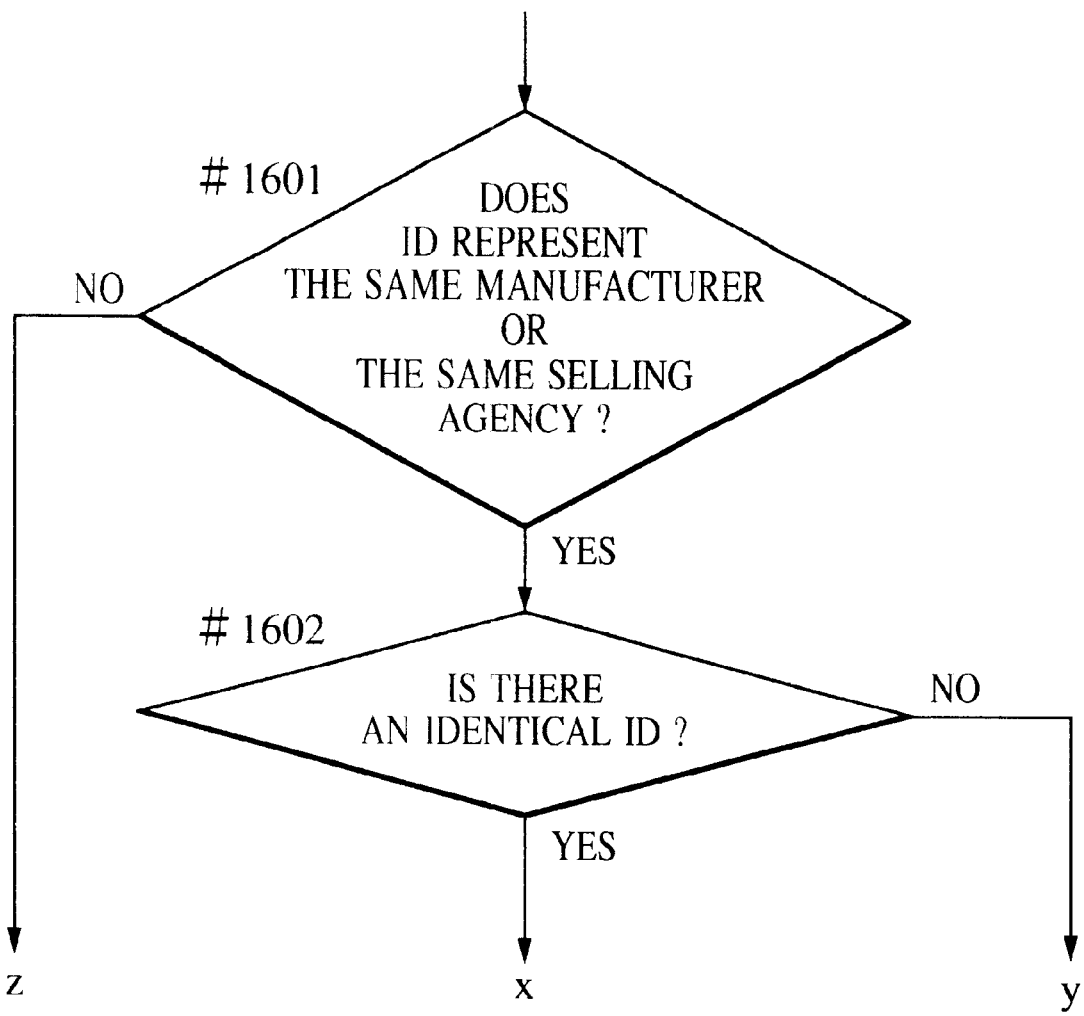
FIG. 9 is a flow chart illustrating the ID number and the film use history determination sequence in the camera of FIG. 1.

FIG. 9 illustrates the ID number/related film use history information determination sequence. In this sequence, a determination is made as to whether or not the first digit of the confirmed cartridge ID number represents the same camera manufacturer or selling agent as the currently used camera, in Step 1601. When the first digit represents the same camera manufacturer or selling agent, a determination is made, in Step 1602, as to whether or not there is an ID number among the ID numbers stored in the memory 21a that is identical to the confirmed cartridge ID number reproduced from the film 2. If there is an identical ID number, the operation proceeds to step 620 of FIG. 7 in order to read out the film use history information corresponding to the ID number from the memory 21a, and to display it on the liquid crystal display section 20. Then, the operation proceeds to Step 621.

The film use history information is useful in making judgments as to whether or not to allow secondary control operations (such as photographic operations using the film, detection of film image information). For example, when the film use history information indicates the remaining number of frames usable for taking photographs, the cartridge information read sensor 15 can be used to detect the initial position of the flange portion 1c from the bar codes, to detect the state of use of the film, or to instantly obtain the state of use of the film, without confirming the existence of the magnetic information recorded in each film frame, in order to set an unused frame at the location where photographic operations are started.

When, in Step 1601, the first digit represents the same camera manufacturer or selling agent as the currently used camera, but an ID number identical to the cartridge ID number is not found stored in the memory 21a in Step 1602, the operation proceeds to Step 621 of FIG. 7.

In Step 621, magnetic information in each frame which has been used to take photographs is read out from the partly used film by the magnetic head 26. When magnetic information exists in a number of frames within a specified number of frames usable for photography, then the magnetic information is successively read (so that the operation goes from Step 622 to Step 621). If magnetic information does not exist in any of the frames, the operation goes from Step 621 to Step 603. If magnetic information exists in all of the frames usable for photography, the operation proceeds from Step 622 to 623, whereby a warning that no more photographs can be taken is given by the sound-generating member 24 or by the liquid display section 20. Then, the feed motor 29 is driven to start rewinding of the film in Step 626 in order to proceed to Step 637b.

When, in Step 1601, the first digit does not represent the same manufacturer or selling agent of the currently used camera (which obviously means that there is no identical ID number stored in the memory 21a), the operation proceeds to Step 623 in order to warn the user that the film cannot be used, by the sound-generating member 24 or by the liquid crystal display section 20. Then, the operation proceeds to Step 626 in order to start rewinding of the film 2.

When, in Step 601, the film is a completely used film or a film which has been subjected to development, film wind-up operations are started in Step 627, and the magnetic head 26 reads out an ID number which may have been recorded on the film in Step 628. When the ID number has been read out in Step 629, the above-described ID/history information determination sequence is executed in Step 634.

Here, when, in Step 1601, an ID number identical to that read out from the film is stored in the memory 21a, the film use history information corresponding to that of the read out ID number is read out from the memory 21a, and displayed along with the ID number on the liquid crystal display section 21 in Step 636. Then, the operation proceeds to Step 637a in order to start film rewinding by the feed motor 29, after which the operation proceeds to Step 637b.

In cases other than those described above (in Steps 1601 and 1602), a warning is given by the liquid crystal display section 20 or the sound generating member 24 in Step 635, after which the operation proceeds to Step 637a.

If in Step 629, a cartridge ID number could not be read out, information corresponding to the selected film use history information is read out from the film by the magnetic head 26 in Step 630. Then, film rewinding is started by means of the feed motor 29 in Step 631, in order to make the information, corresponding to the read out film use history information, correspond to the ID number issued by the camera, after which the corresponding information is stored in the memory 21a in Step 632. Thereafter, in Step 636, during rewinding by driving operations, the issued ID number is recorded in the reader section of the film. The stored ID number and the film use history information are displayed on the liquid crystal display section 20 in Step 636, and the operation proceeds to Step 637a.

The camera operation sequence in the first embodiment allows individual information helpful in identifying films to be obtained when necessary in accordance with the state a of use of films. In the sequence, an ID number is not issued for unused films in order to prevent too much of the storage capacity of the memory 21a in the camera from being used. The film use history information regarding, for example, the last frame used for photography of partly used films or completely used films is rewritten in the memory 21a when necessary, so that new information helpful in identifying films can be obtained.

For a film with an ID number which indicates that the film cannot be used in the camera, the camera is set so that photographs cannot be taken or film feeding cannot be carried out. The camera provides film security protection, and does not allow usage of cartridges whose essential characteristics are not known.

By displaying the ID number and film use history information of loaded films on the liquid crystal display section 20, it is possible to identify films which cannot be easily identified from the external form of cartridges.

Figure 10A:
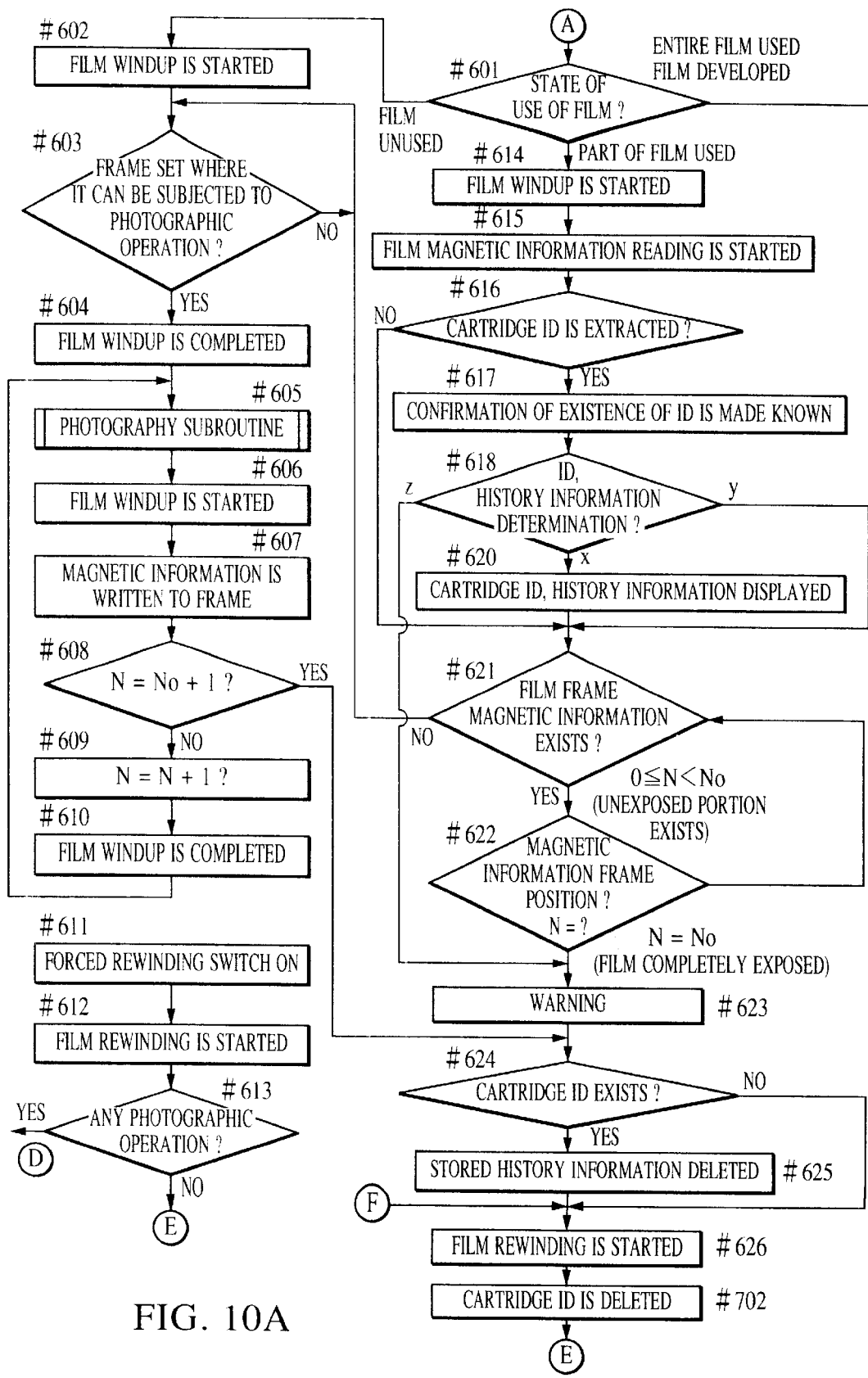

FIG. 10 illustrates a modification of the operation sequence in the first embodiment. In the sequence, when the film cartridge loaded in a camera is a completely used cartridge, or a cartridge whose film has been subjected to development, or a film cartridge which has become a completely used film cartridge after use, the ID number magnetically recorded in the film cartridge is deleted, and the ID number identical to the ID number read out from the film cartridge, and the film use history corresponding thereto are deleted from the memory 21a. This prevents the ID number from being used again, and too much of the storage capacity of the memory 21a from being used.

In the sequence illustrated in FIG. 10, the steps which are similar to those in the sequence illustrated in FIG. 7 are given the same reference numerals. It is to be noted that the steps carried out up to A to achieve cartridge loading are the same as those carried out in the sequence of FIG. 6 to achieve cartridge loading.

Referring to FIG. 10, when, in Step 608, the loaded film is a completely used film, or when the loaded film, judged as being a partly used film, is actually a completely used film (N=N0) in Step 622, and the ID number is read from the film in Step 624, the operation proceeds to Step 625. When there is an ID number identical to that in the memory 21a, this ID number and the corresponding film use history information are deleted from the memory 21a. Then, driving operations are carried out to rewind the film in Step 626. During rewinding, the corresponding ID number magnetically recorded in the film by the magnetic head 26 is deleted in Step 702 in order to proceed to Step 637b.

When all of the frames of the loaded frame usable for photography have been used or subjected to development in Step 601, the camera user is warned that a proper film is not being used, by, for example, light or sound, or by the display section in Step 703. Then, the film is wound up by driving until a predetermined portion thereof where the ID information is recorded is reached. When, in Step 704, it is wound up so that a location of the film where the ID can be deleted is reached, it is rewound by driving in Step 626, in order to delete the ID information magnetically recorded on the film.

SECOND EMBODIMENT

Figure 12A:
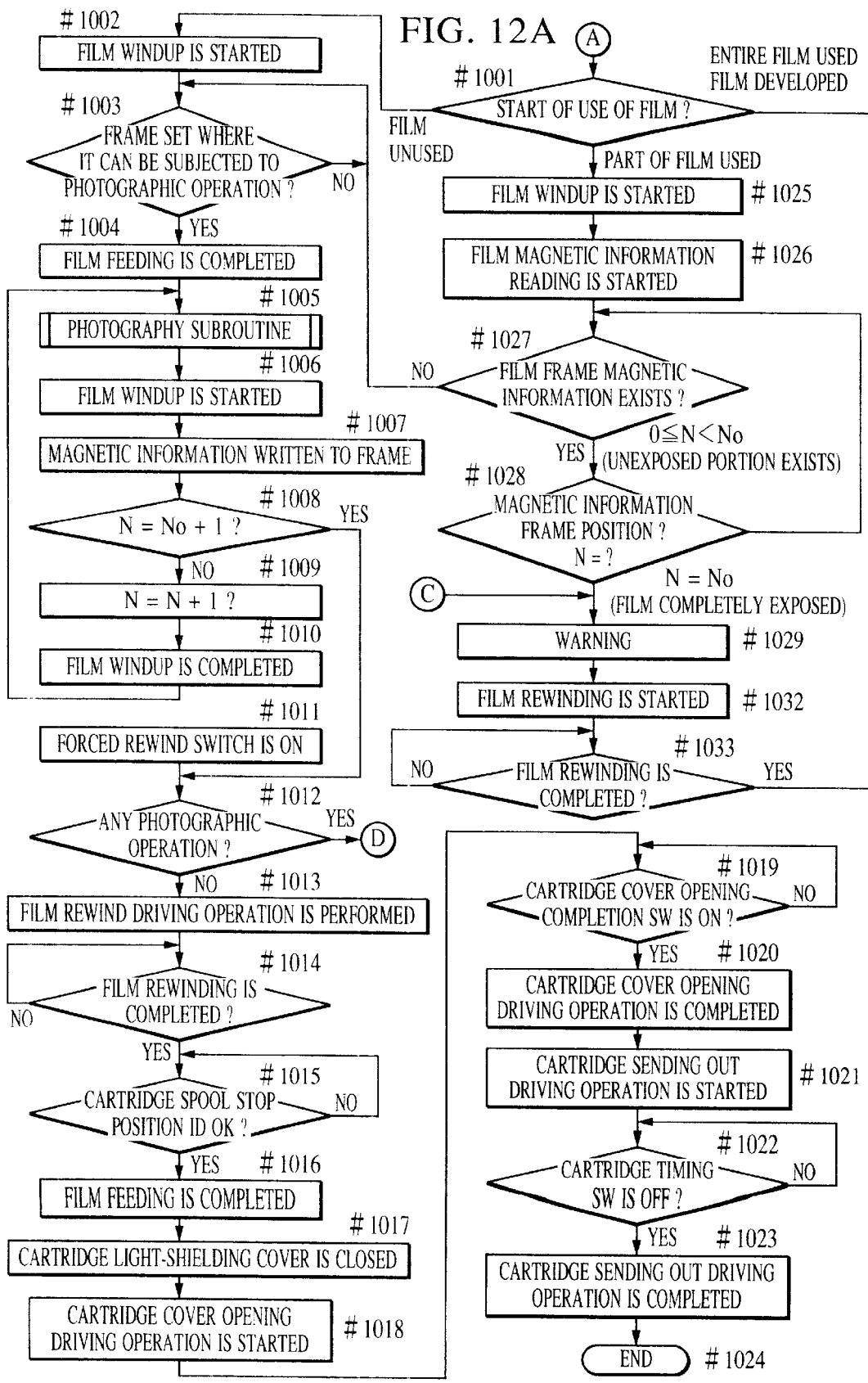
FIGS. 12, 12A and 12B are a flow chart illustrating the operational sequence of the second embodiment of the camera in accordance with the present invention.
Figures 12, 12B:
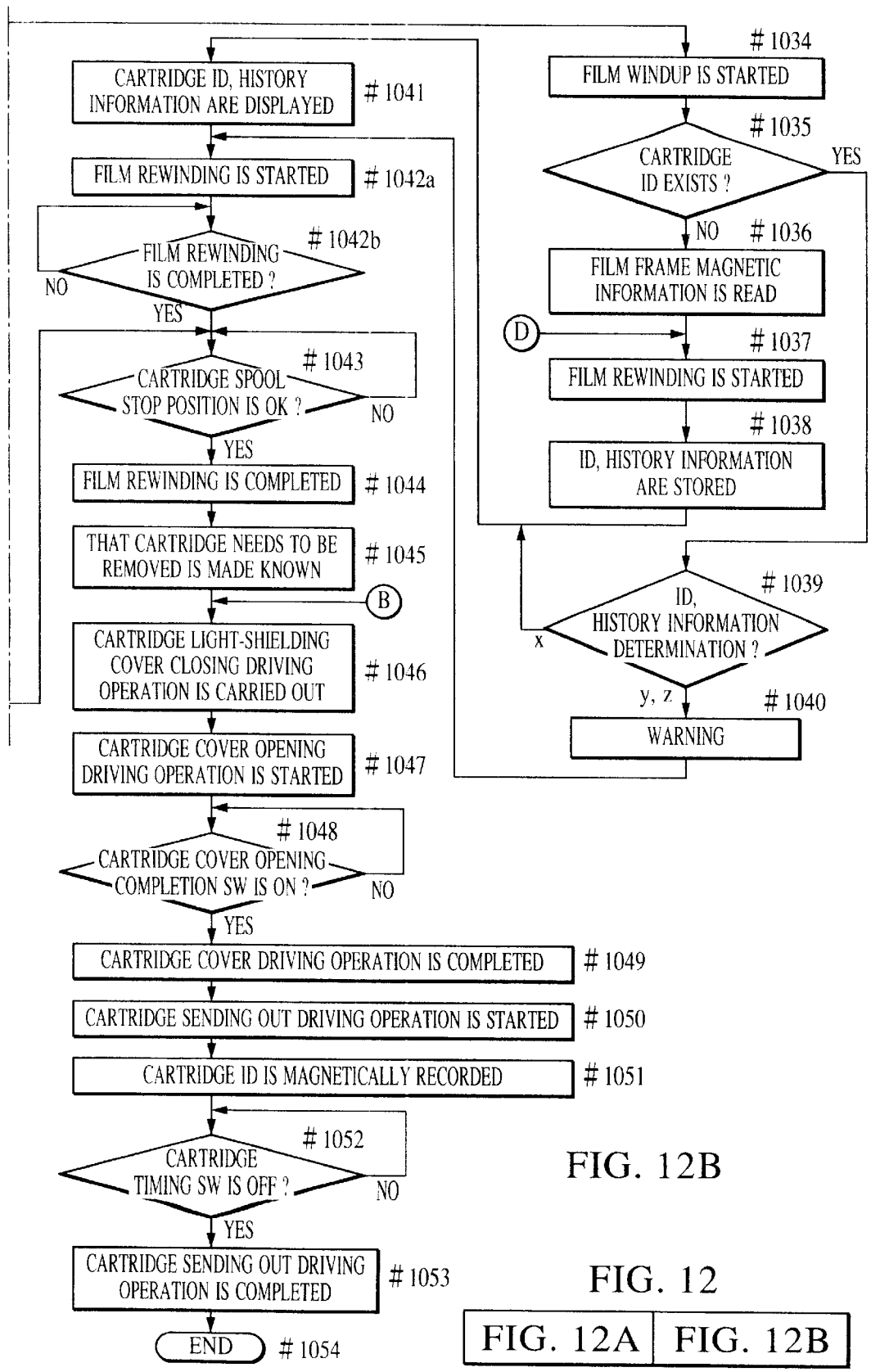

FIGS. 11 and 12 illustrate the camera operation sequence in a second embodiment of the present invention. In the second embodiment, it is assumed that a magnetic recording section in which an ID number is recorded is provided on the exterior portion of a cartridge. Like the operation sequence in the first embodiment, the operation sequence in the second embodiment is executed in the camera illustrated in FIGS. 3 and 4.

In FIG. 11, when a camera user, trying to load cartridge 1 into a camera, presses the cartridge chamber cover opening operation switch 5 in Step 902, and finds out that another cartridge is not already loaded in the camera in Step 903, the control circuit 21 causes the cartridge chamber cover drive motor 10 to be driven to start opening the cartridge chamber cover 4 by the driving operation in Step 905. When the cartridge chamber cover 4 is completely opened, and the cartridge chamber cover opening detection switch 6 is pressed in Step 906, the driving of the motor 10 is stopped in Step 907. When the cartridge 1 is loaded into the cartridge chamber 3C, and the draw-in start switch 8 is pressed in Step 908, the cartridge loading motor 30 is driven to draw in the cartridge 1 into the cartridge chamber 3C by the rollers 9a and 9b by the driving operation, in Step 909.

At the same time, the cartridge magnetic head 13 starts to read out the ID number, recorded in the magnetic recording section 1a on the exterior portion of the cartridge in Step 910. When a loaded end of the drawn in cartridge 1 presses the loading completion switch 14 in Step 911, the draw-in operation of the cartridge 1 is completed in Step 912, In addition, the reading of the cartridge ID number is completed in Step 913.

When the cartridge ID number has been read out in Step 914, the user is informed that the ID number has been detected in Step 915. Then, in Step 916, the operation proceeds to the ID/film use history information determination sequence illustrated in FIG. 9.

In the ID/film use history information determination sequence, a determination is made as to whether or not the first digit of the confirmed cartridge ID number represents the same camera manufacturer or selling agent as the currently used camera in Step 1601. When the first digit represents the same camera manufacturer or selling agent, a determination is made, in Step 1602, as to whether or not there is an ID number among the ID numbers stored in the memory 21a that is identical to the confirmed cartridge ID number reproduced from the film 2. If there is an identical ID number, the operation proceeds to step 917 of FIG. 10 in order to read out the film use history information corresponding to the ID number from the memory 21a, and to display it on the liquid crystal display section 20. Then, the operation proceeds to Step 918.

The film use history information is useful in making judgments as to whether or not to allow secondary control operations (such as photographic operations using the film, detection of film image information). For example, when the film use history information indicates the remaining number of frames usable for taking photographs, the cartridge information read sensor 15 can be used to detect the initial position of the flange portion 1c from the bar codes, to detect the state of use of the film, or to instantly obtain the state of use of the film, without confirming the existence of the magnetic information recorded in each film frame, in order to set the unused frame at the location where photographic operations are started.

When, in Step 1601, the first digit represents the same camera manufacturer or selling agent as the currently used camera, but an ID number identical to the cartridge ID number is not found stored in the memory 21a in Step 1602, the operation proceeds to Step 918 of FIG. 11.

When, in Step 1601, the first digit does not represent the same manufacturer or selling agent of the currently used camera (which obviously means that there is no identical ID number stored in the memory 21a), the operation proceeds to Step 1029 (FIG. 12A) in order to warn the user that the film cannot be used, by the sound-generating member 24 or by the liquid crystal display section 20. Then, the operation proceeds to Step 1032 in order to start rewinding of the film 2.

In Step 918, the motor 10 is driven once again in order to close the cartridge chamber cover 4. When the cartridge chamber cover 4 is completely closed, and the closing completion switch 7 is pressed in Step 919, the driving operation carried out to close the cartridge chamber cover 4 is completed in Step 920.

Then, in order to cause the sensor 15 to read the bar code information (indicating the state of use of the film) provided at the flange portion 1c of the cartridge 1, the motor 19 is driven in order to rotate the driver 17 and open the cartridge light-shielding cover, provided at the opening of the cartridge 1 where the film moves into and out of the cartridge 1, in Step 921. When the fork gear 16 is rotated as a result of driving the feed motor 29, the film is rewound by the driving operation in Step 922. During the driving, the bar code information is read out in Step 923 in order to proceed to Step 1001.

On the other hand, when, in Step 903, another cartridge 1 has been detected in the camera, a confirmation is made as to whether or not the film has been rewound in Step 904 in order to proceed to Step 1046.

When, in Step 1001, a determination is made from the bar code information that the loaded film is a film that has not been used, the feed motor 29 is driven to wind up the film upon the spool 28 in Step 1002. When the position sensor 23 detects that the film has been advanced so that it can be used to take photographs in Step 1003, the winding up of the film by the driving operation is stopped in Step 1004. Then, in Step 1005, a photographic subroutine is executed in order to expose the film. In the photographic subroutine, various photographic operations, such as releasing operations, distance measurements, focusing operations, and shutter driving operations, may be carried out at the photographic section 31 of FIGS. 3 and 4. After executing the photographic subroutine, the operation proceeds to Steps 1006 and 1007.

In Steps 1006 and 1007, when the film is advanced so that the next frame is set in position, driving operations are carried out to wind up the film in order to write magnetic information in the frame used for photography.

When the frame count number N is less than a specified usable frame count number No, that is, when it is determined that photographs can still be taken in Step 1008, the sensor 23 detects the advancement of the next frame to the location where a photograph can be taken, in order to add one to the frame count number N in Step 1009. Thereafter, in Step 1010, the feeding of the film is completed, and the user waits for photographic operations to be executed again in Step 1005.

When, in Step 1008, the frame count number N is greater than the specified usable frame count number No (or when it is determined that photographs cannot be taken), and when, in Step 1012, the loaded film 2 has not been used to take photographs even once, the feed motor 29 is driven to start rewinding of the film in Step 1013. It is to be noted that when, during photography standby or the like, the forced rewind switch 27 is pressed in Step 1011, the operation proceeds to Step 1012.

When the film rewinding is completed in Step 1014, the flange portion 1c is stopped at a predetermined location in order to allow the cartridge information read sensor 15 to determine the state of use of the film (such as whether or not the film is an unused film, a partly used film, a completely used film, or a film which has been subjected to development), in Steps 1015 and 1016.

Then, the motor 19 is driven to close the cartridge light-shielding cover in Step 1017, and the opening of the cartridge chamber cover 4 is started by a driving operation in Step 1018. When the cartridge chamber cover 4 is opened, and the cartridge chamber cover opening detection switch 6 is pressed in Step 1019, the opening of the cartridge cover 4 by the driving operation is completed in Step 1020.

The motor 30 is driven to cause the cartridge 1 to start to move out of the camera in Step 1021. When the exterior portion of the cartridge 1 no longer presses the timing switch 12 in Step 1022, the moving out of the cartridge 1 by the driving operation is completed in Step 1023.

When, in Step 1012, the unused film has been used to take photographs, the operation proceeds to Step 1037 in order to drive the feed motor 29 and start film rewinding. The aforementioned mode change-over sequence illustrated in FIG. 4 is executed in order to make the selected film use history information correspond to the issued ID, after which they are stored in the memory 21a in Step 1038. Then, the stored ID number and the corresponding film use history information are displayed on the liquid crystal section 20 in Step 1041. After completion of the film rewinding has been confirmed in Step 1042b, the cartridge information read sensor 15 is used to stop the flange portion 1c at a predetermined location, allowing determination of the state of use of the film, in Steps 1043 and 1044.

When the film rewinding is completed, the user is informed that the cartridge 1 should be taken out in Step 1045. In Step 1046, the motor 19 is driven to close the cartridge light-shielding cover, and the cartridge chamber cover 4 starts to open as a result of the driving operation in Step 1047.

When the cartridge chamber cover 4 has been completely opened, and the cartridge chamber cover opening detection switch 6 is pressed in Step 1048, the opening of the cartridge chamber cover 4 by the driving operation is completed in Step 1049.

When the cartridge 1 starts to move out of the camera as a result of driving the motor 30 in Step 1050, the cartridge magnetic head 13, in Step 1051, records the cartridge ID number in the magnetic recording section 1a on the exterior portion of the cartridge 1.

When the cartridge exterior portion no longer presses the timing switch 12 in Step 1052, the moving out of the cartridge 1 from the camera by the driving operation is completed in Step 1053.

When, in Step 1001, the loaded film 2 is a partly used film, the film is wound up in Step 1025, in order to cause the magnetic head 26 to read out the magnetic information recorded in each frame in Step 1026. When the number of frames, in which magnetic information is recorded, is within the specified number No of usable frames, the magnetic information is successively read out in Step 1027. When there is a frame without magnetic information recorded therein, that is, when there is an unexposed frame, the operation proceeds to Step 1028.

When all of the frames usable for photography have magnetic information recorded therein, the operation proceeds from Step 1028 to Step 1029, and the sound-generating member 24 gives out a warning that no more photographs can be taken. Thereafter, the feed motor 29 is driven to start rewinding of the film 2 in Step 1032. When the rewinding of the film 2 is completed in Step 1033, the operation proceeds to Step 1043.

On the other hand, when, in Step 1001, the loaded film 2 is a completely used film or a film which has been subjected to development, the film is wound up by a driving operation in Step 1034. When, in Step 1035, the cartridge ID has been read, the operation proceeds to Step 1039 in order to execute the ID/film use history information determination sequence illustrated in FIG. 9.

Here, when, in Step 1601, an ID number identical to that read out from the film is stored in the memory 21a in Step 1601, the film use history information corresponding to that of the read out ID number is read out from the memory 21a, and displayed along with the ID number on the liquid crystal display section 21 in Step 1041. Then, the operation proceeds to Step 1042a in order to start film rewinding by the feed motor 29, after which the operation proceeds to Step 1042b.

In cases other than those described above (in Steps 1601 and 1602), a warning is given by the liquid crystal display section 20 or the sound generating member 24 in Step 1040, after which the operation proceeds to Step 1042a.

When, in Step 1035, a cartridge ID number could not be read (or does not exist), information corresponding to the selected film use history information is read from the film by the magnetic head 26 in Step 1036. The film rewinding is started by means of the feed motor 29 in Step 1037, and the information, corresponding to the read out film use history information, is made to correspond with the ID number issued by the camera, and is stored in the memory 21a in Step 1038. The stored ID number and the film use history information are displayed on the liquid crystal display section 20 in Step 1041, after which the operation proceeds to Step 1042a to start film rewinding.

The camera operation sequence in the second embodiment differs from that of the first embodiment in that the individual film ID numbers are recorded in the magnetic recording section on the exterior portion of cartridges, so that the ID number of the cartridges can be quickly confirmed, as a result of which the corresponding film use history information can be quickly displayed.

THIRD EMBODIMENT

Figure 13:
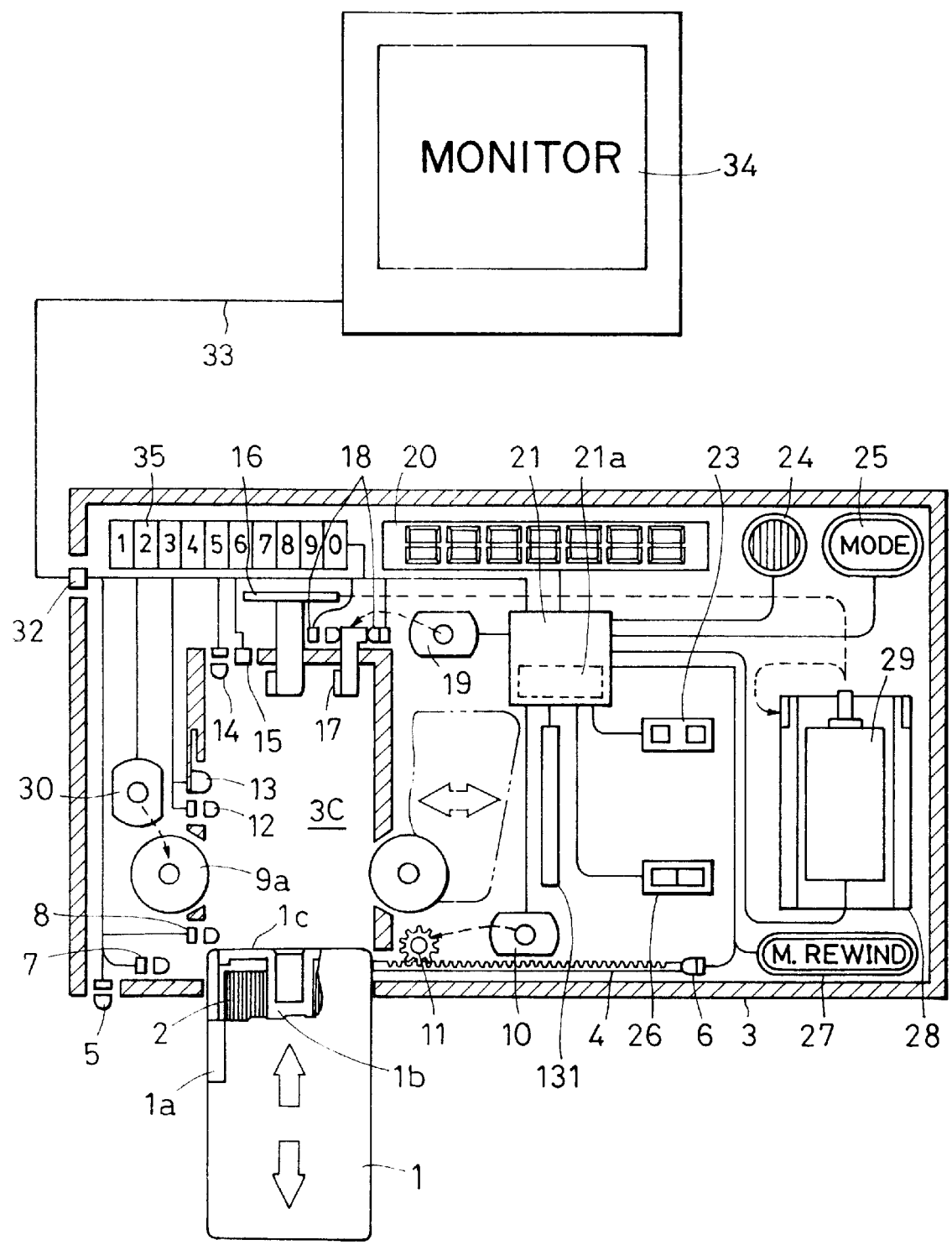
FIG. 13 is a sectional view of an image reproducing apparatus used in a third embodiment of the present invention.
Figure 14:
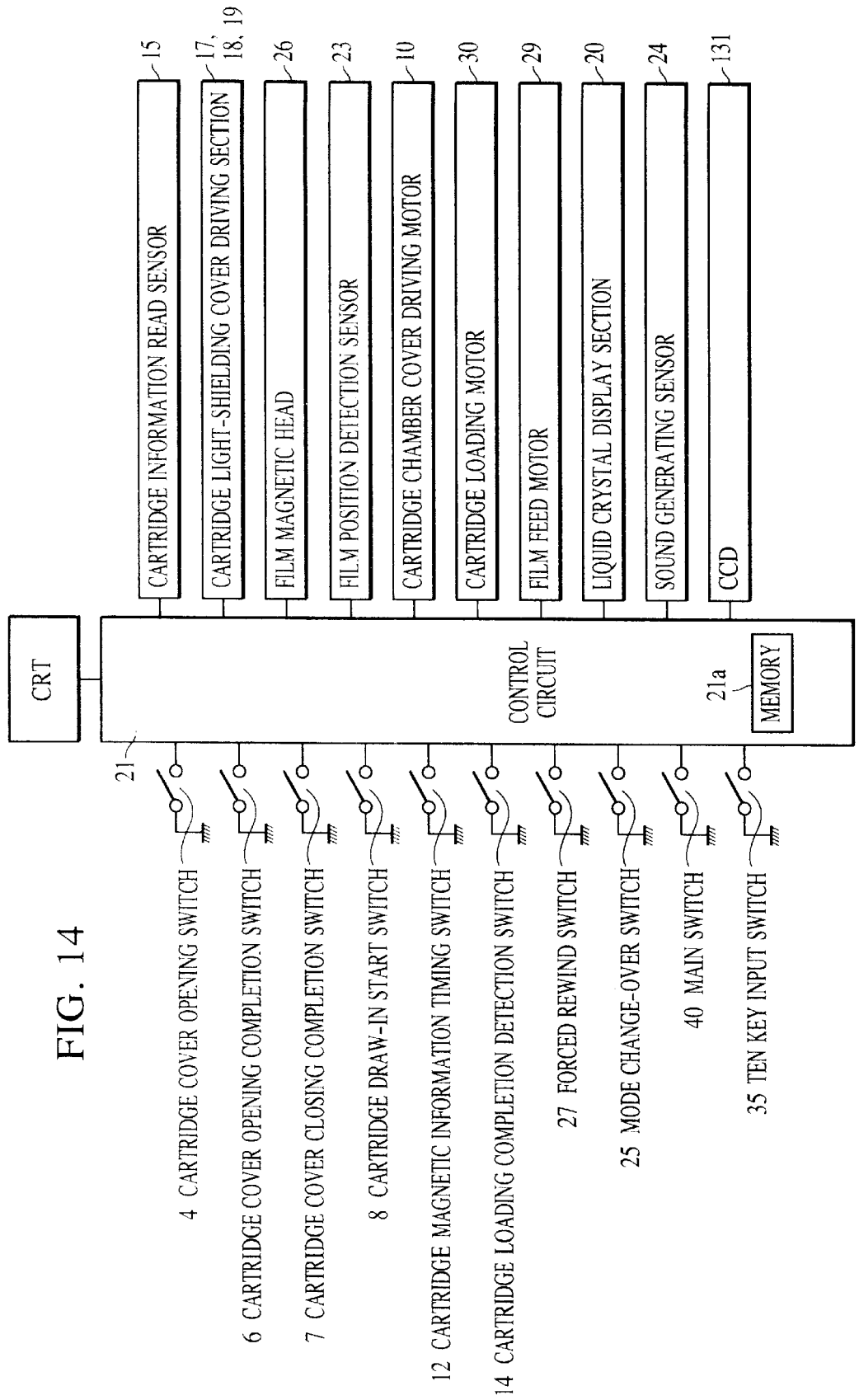
FIG. 14 is a block diagram of the electrical circuit in the image reproducing apparatus of FIG. 13.

FIGS. 13 and 14 illustrate an image reproducing apparatus in a third embodiment of the present invention. In these figures, the same reference numerals as those used in FIGS. 3 and 4 are employed to denote component parts of the third embodiment which are the same or equivalent to those of the first embodiment.

In FIGS. 13 and 14, reference numeral 131 denotes a charge-coupled device (CCD) line sensor for detecting image information recorded on the film 2 in order to store the detected image information in the memory 21a. Reference numeral 32 denotes an information output terminal used to output image information to a cathode ray tube (CRT) monitor 34, being an image output device disposed outside the camera, through a connection 33. Although in the embodiment the monitor 34 is disposed outside the camera body, it may be formed integrally with the camera.

Reference numeral 35 denotes a ten key switch used to respond to various operation menus displayed on the monitor 34. Since the image reproducing apparatus is not used to take photographs, a photography section, which is provided in the camera illustrated in FIGS. 2 and 3, is not provided.

Figure 15:
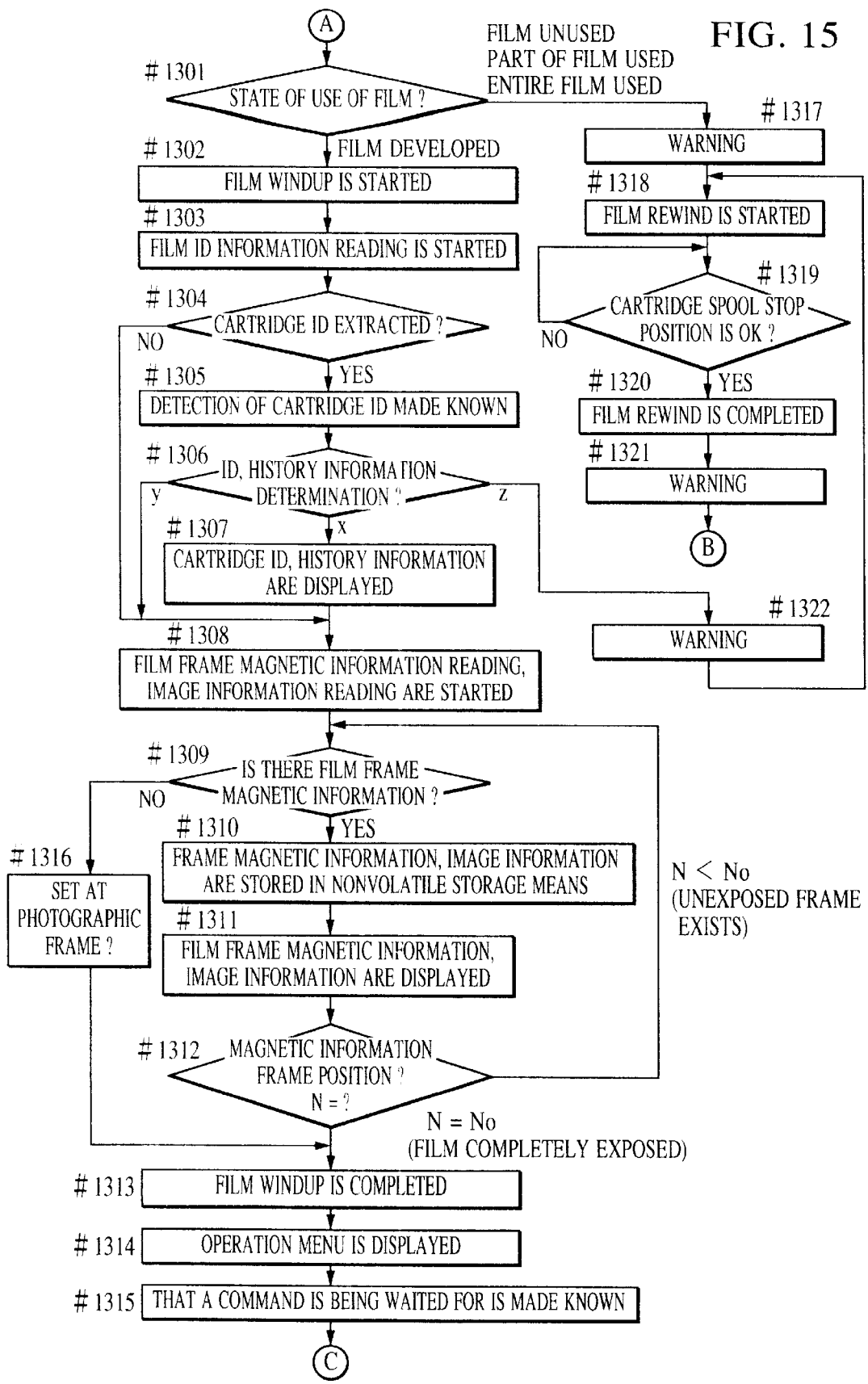
FIG. 15 is a flow chart illustrating the operational sequence of the image reproducing apparatus of FIG. 13.
Figure 16:
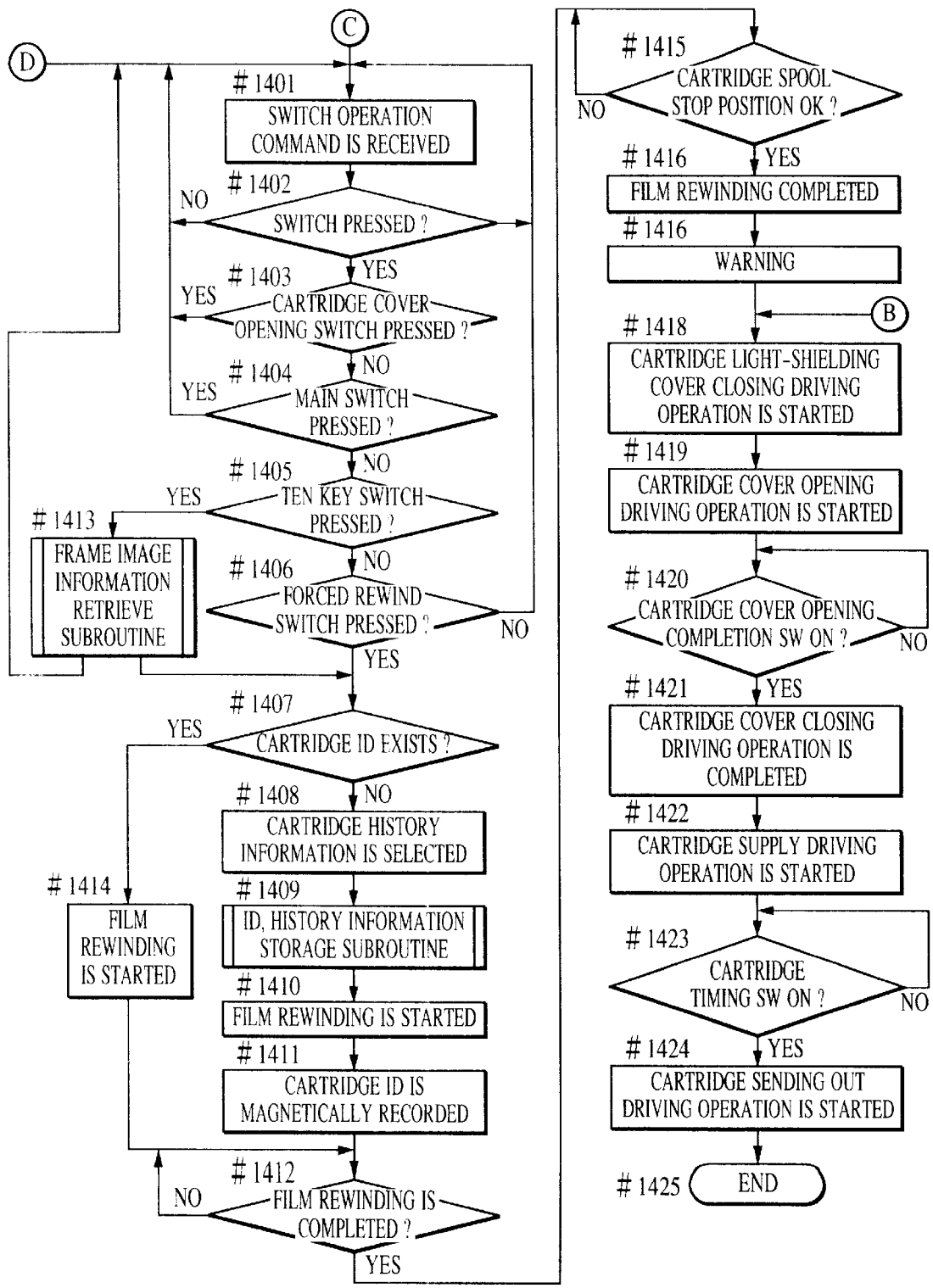
FIG. 16 is a flow chart illustrating the operational sequence of the image reproducing apparatus of FIG. 13.

FIGS. 15 and 16 illustrate the operation sequence of the image reproducing apparatus. In the sequence of FIG. 15, the steps carried out up to A to achieve cartridge loading are the same as those carried out in the sequence of FIG. 6 in the first embodiment. It is to be noted that the Step 516 of FIG. 6 is followed by Step 1301 of FIG. 15, and Step 503 is followed by Step 1418 of FIG. 16.

In FIG. 15, when, in Step 1301, the loaded film 2 has been subjected to development by the sensor 15, and the winding up of the film 2 is started in Step 1302, detection of the cartridge ID number recorded in the magnetic recording section of film 2 is started in Step 1303.

When the cartridge ID number has been read out in Step 1304, the detection of the cartridge ID number is made known to the user in Step 1305, and the ID/film use history information determination sequence of FIG. 9 is executed, in Step 1306, to determine whether or not the detected cartridge ID number indicates a cartridge which can be used.

In the sequence, a determination is made as to whether or not the first digit of the confirmed cartridge ID number represents the same apparatus manufacturer or selling agent as the currently used apparatus, in Step 1601. When the first digit represents the same apparatus manufacturer or selling agent, a determination is made, in Step 1602, as to whether or not there is an ID number among the ID numbers stored in the memory 21a that is identical to the confirmed cartridge ID number reproduced from the film 2. If there is an identical ID number, the operation proceeds to step 1307 of FIG. 15 in order to read out the film use history information corresponding to the ID number from the memory 21a, and to display it on the liquid crystal display section 20. Then, the operation proceeds to Step 1308.

When, in Step 1601, the first digit represents the same apparatus manufacturer or selling agent as the currently used apparatus, but an ID number identical to the cartridge ID number is not found stored in the memory 21a in Step 1602, the operation proceeds to Step 1308 of FIG. 14.

When, in Step 1601, the first digit does not represent the same manufacturer or selling agent of the currently used apparatus (which obviously means that there is no identical ID number stored in the memory 21a), the operation proceeds to Step 1322 of FIG. 15 in order to warn the user that the film cannot be used, by the sound-generating member 24 or by the liquid crystal display section 20. Then, the operation proceeds to Step 1318 in order to start rewinding of the film.

In Step 1308, the magnetic head 26 starts to reproduce, for every frame, photographic information (such as whether or not strobo photographic operations have been carried out, date of photography, type of external light, existence of backlight, environment, etc.) recorded in the magnetic recording section of the film 2. At the same time, the CCD sensor 31 starts to detect frame images recorded on the film 2.

When, in Step 1309, the film magnetic information has been reproduced, the reproduced frame magnetic information and the image information are stored in the memory 21a in Step 1310, and are combined and displayed on the monitor 34 in Step 1311. Instead of displaying both the frame magnetic information and the image information on the monitor 34, only the frame information may be displayed on the liquid crystal display section, or a sound may be generated.

Figure 17:
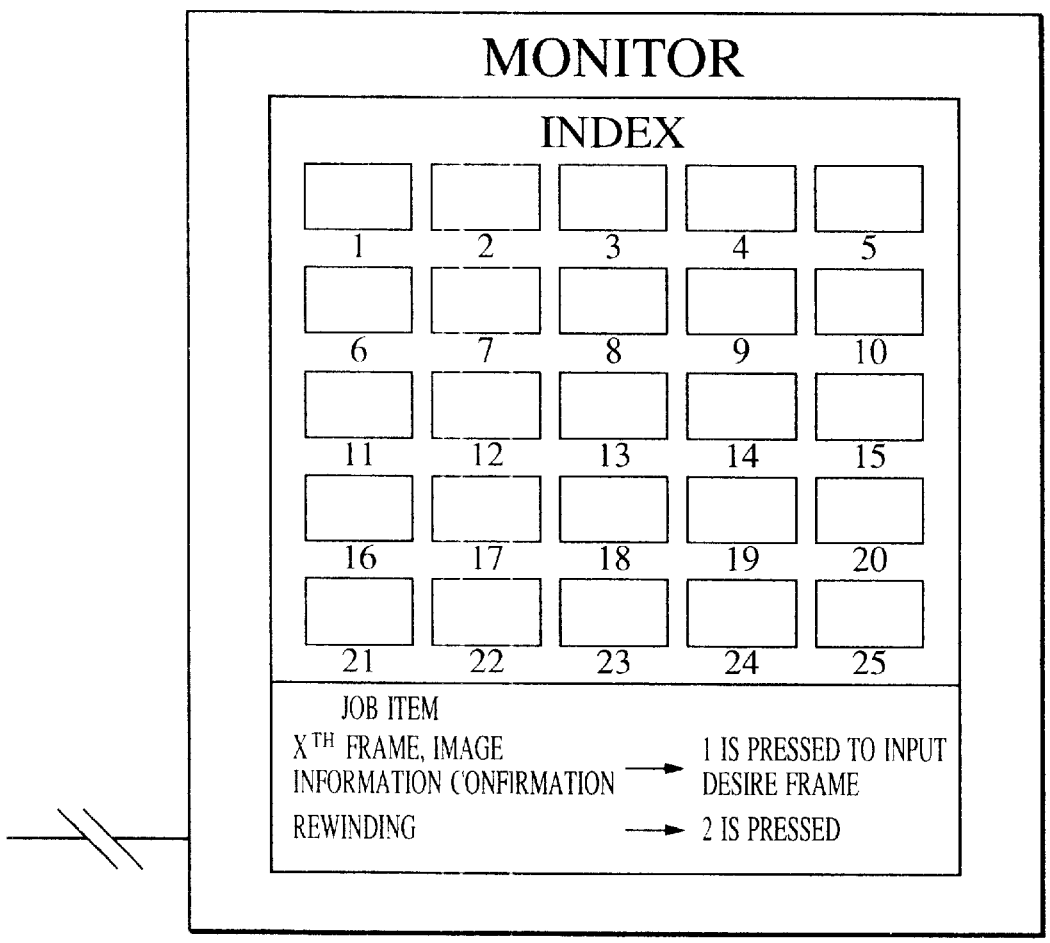
FIG. 17 illustrates an example of a monitor display in the image reproducing apparatus of FIG. 13.

When the count number N of frames, in which magnetic information is recorded, is less than a predetermined number No of usable frames, detection of the magnetic information and the image information is continued (so that the operation goes from Step 1312 to 1309). When the count number N of frames, in which magnetic information is recorded, reaches the predetermined number No of usable frames, in Step 1312, the winding up and feeding of the film 2 are completed in Step 1313. Then, in Step 1314, an operation menu, such as that shown in FIG. 17, is displayed on the monitor 34. In Step 1315, that a command is being waited for is made known. The operation then proceeds to Step 1401 of FIG. 16.

In Step 1314, all the indices of the image information read out from the film, and the operation menu showing the various frame information in detail are displayed. An operation menu, which is not shown, is displayed on the monitor 34 in order to allow, for example, deletion of the cartridge ID number, deletion of ID numbers and corresponding film use history information stored in the memory 21a, setting of ID determination standard, or changing of ID determination standard. These operations are executed by ten key input operations.

In FIG. 15, when, in Step 1304, a cartridge ID could not be read out, detection of the film frame magnetic information and the image information is started in Step 1308.

When, in Step 1309, a frame without magnetic information is detected, this frame is set in Step 1316, and the winding up of the film 2, by driving, is completed in Step 1313.

In Step 1301, when the loaded film has not been subjected to development, the user is warned in Step 1317 that the cartridge cannot be used. Film rewinding is performed by driving in Step 1318, and the flange portion 1c is stopped at a location which indicates that the film has not been subjected to development, in Step 1319. Then, the film rewinding is completed in Step 1320, and the user is urged to remove the cartridge 1 in Step 1321. The operation then proceeds to Step 1418 of FIG. 16.

When, in Step 1401 of FIG. 16, the user waits for a switch operation command, and a signal which indicates that a switch has been pressed is detected by the control circuit 21 in Step 1402, the operation proceeds to Steps 1403 to 1406 in order to determine which switch has been pressed.

When the cartridge chamber cover opening switch 5 has been pressed, the pressing operation is cancelled, since the cartridge 1 is being loaded. In this case, the operation goes from Step 1403 back to Step 1401. When the main switch 40 has been pressed, the execution of the main sequence of FIG. 16 is temporarily stopped. When the main switch 40 is pressed once again, the user waits for a switch operation command. In this case, the operation returns to Step 1401 from Step 1404.

When a ten key has been pressed in accordance with the operation menu displayed on the monitor 34, an image information search subroutine is executed (so that Steps 1405 to 1413 are carried out). The image information search subroutine is executed in accordance with instructions displayed on the monitor 34 or by ten key input, in order to, for example, enlarge a desired piece of frame image information and display it on the monitor 34, or to display magnetic information of a certain frame, or to rewrite magnetic information of a certain frame, or to rewind a loaded film.

After the execution of the image information search subroutine, the operation either returns to Step 1401 or goes to Step 1407 (in which film rewinding is carried out after reception of a rewind command). These steps are not described in detail below.

When, in Step 1406, the forced rewind switch 27 is pressed, and when, in Step 1407, there is no cartridge ID number, information corresponding to the selected cartridge history item is selected from the cartridge frame information already stored in the memory 21a, in Step 1408. Then, the subroutine for storing an ID number and the history item are stored in the memory 21a is executed. The sequence for storing the ID number and the history item is the same as the sequence of FIG. 8 executed in the first embodiment. If the apparatus specifications are satisfied, either the subroutine of FIG. 8A or the subroutine of FIG. 8B may be executed.

When the storage of the ID number and the history item is completed, rewinding of the film 2 is started by driving, in Step 1410. Then, in Step 1411, the ID number is recorded in the film magnetic recording section.

When, in Step 1412, the rewinding of the film 2 is completed, the film feeding is stopped at the moment the cartridge shaft 1b is positioned at a location corresponding to the state of use of the film 2 (Steps 1415 and 1416).

Thereafter, in Step 1417, the user is informed that the cartridge 1 has been moved out of the apparatus. In Step 1418, the motor 19 is driven to close the cartridge light-shielding cover. In Step 1419, the opening of the cartridge chamber cover 4 by a driving operation is started. When, in Step 1420, the cartridge chamber cover opening completion detection switch 6 has been pressed after the cartridge chamber cover 4 has been completely opened, the opening of the cartridge chamber 4 by the driving operation is completed in Step 1421.

In Step 1422, the cartridge 1 starts to move out of the apparatus as a result of driving the motor 30. When, in Step 1423, the exterior portion of the cartridge 1 no longer presses the timing switch 12, the moving out of the cartridge 1 by the driving operation is completed in Step 1424.

When, in Step 1407, there is an ID number recorded on the film, the film is rewound by a driving operation in Step 1414, without issuing a new ID number.

In the above-described embodiments, the film 2 is an image recording medium, the control circuit 21 is a determining means and a controlling means, the magnetic heads 13 and 26 are recording means and reading means, the memory 21a is a storing means, and the liquid crystal display section 20 and the sound-generating member 24 are warning means.

The present invention is not limited to the structures of the above-described embodiments. Any structure may be used as long as the functions described in the claims or the functions of the structures of the above-described embodiments can be provided.

In the embodiments, an ID number is recorded on either the film or the cartridge. However, it may be recorded on both the film and the cartridge, and each recorded ID number may be read out.

The form of ID numbers is not limited to that described above, so that other forms of ID numbers may be used in other embodiments, by changing the number of digits, by changing what these digits represent, or the like. For example, although in the embodiments the first digit of the ID number represents the manufacturer or the selling agent, in other embodiments a digit which represents the manufacturer and the selling agent may be omitted, and a digit which represents the apparatus model may be used to represent the manufacturer or the selling agent; or in other embodiments a digit which represents the apparatus model may be omitted.

The types of film use history information are not limited to those described in the embodiments, so that any type of information may be used as long as it tells something about the film use history.

In the camera, an ID number, made to correspond to film use history information, does not have to be the same as the ID number to be recorded on the cartridge or the film. Therefore, any method may be used as long as the film use history information corresponding to the ID number recorded on the cartridge or the film can be identified.

In general, an ID number is issued by the camera: the camera user cannot arbitrarily issue it. However, in certain cases, the camera may be set so that the camera user can change the ID number issued by the camera. In this case, it is necessary to provide a structure which prohibits the user from changing an ID number to an issued ID number, and which warns the user that an ID number cannot be changed to an issued ID number.

The camera operational sequences described in the embodiments are only examples: they may be modified, when necessary, in accordance with the apparatus capability, the purpose of use, or the like. For example, when, in the ID/film use history information determination sequence, film use history information corresponding to an ID number read from the film cartridge cannot be found, this may be indicated on the display, and photographic operations may be allowed as in usual cases.

In the above-described embodiments, when the location of a frame usable for photography is found from the film use history information, a control operation is carried out to advance the film so that the frame usable for photography is set at a location where a photograph can be taken. In other embodiments, other control operations may be carried out, based on the film use history information.

When an ID number is already recorded on a film by a different apparatus, this ID number may be used to store film use history information.

In the above described embodiments, a cartridge whose film has been rewound is always moved out of an apparatus. In other embodiments, the camera operation sequence may be completed when the film has been rewound. With the film in a rewound state, the cartridge may be kept in the camera or the image reproducing apparatus.

According to the present invention, an image recording medium other than a film may be used.

According to the present invention, information may be recorded onto or read from a film or a cartridge other than by electrical, optical, or magnetic means.

According to the present invention, the configuration of the software and the hardware used in the above-described embodiments may be changed.

According to the present invention, technical features of the above-described embodiments may be combined, when necessary.

According to the present invention, part of or the entire structure disclosed in the claims or described in the embodiments may be used to form an apparatus, may be linked to another apparatus, or may be used to form a component part of an apparatus.

The present invention may be applied to various cameras, such as single-lens reflex cameras, lens shutter cameras, or video cameras, or optical apparatuses other than cameras, or other types of apparatuses. It may also be applied to devices applied to cameras, optical apparatuses, or other types of apparatuses. It may be further applied to a component part of cameras, optical apparatuses, or other types of apparatuses.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera usable with a film cartridge comprising:
   identification means for assigning individual identification information to a film cartridge loaded in the camera;
   means for recording the individual identification information assigned by said identification means on one of the film cartridge loaded in the camera and film accommodated in the film cartridge;
   means for storing in the camera individual identification information of the film cartridge and corresponding film use history information of the film accommodated in the film cartridge, such that the corresponding film use history information is identifiable based on the individual identification information;
   means for detecting individual identification information recorded on at least one of the film cartridge loaded in the camera and film accommodated in the film cartridge;
   means for reading out from said storing means film use history information corresponding to the individual identification information detected by said detecting means; and
   means for controlling operation of the camera in accordance with the film use history information read out from said storing means by said reading means.

2. A camera according to claim 1, wherein said recording means is magnetic recording means.

3. A camera according to claim 1, wherein said storing means is nonvolatile memory.

4. A camera according to claim 1, wherein the individual identification information includes at least one of the manufacturer, the selling agent, and the model of the camera.

5. A camera according to claim 1, wherein said storing means stores as film use history information at least one of the place of a photographic operation, the date of a photographic operation, and the remaining number of frames of film accommodated in the film cartridge that are usable for photography.

6. A camera according to claim 1, further comprising display means for displaying information, wherein said controlling means controls operation of the camera so as to display information in said display means in accordance with film use history information read out from said storing means by said reading means.

7. A camera according to claim 1, wherein said storing means stores individual identification information and film use history information corresponding to the individual identification information, and wherein said controlling means compares the individual identification information detected by said detecting means and the individual identification information read out from said storing means by said reading means.

8. A camera according to claim 1, further comprising:
   means for determining a state of use of the film accommodated in a film cartridge loaded in the camera,
   wherein said controlling means controls operation of the camera based on a determination result of said determining means.

9. A camera according to claim 1, wherein said storing means changes a manner of storing film use history information based on a remaining amount of storage capacity of said storing means.

10. A camera according to claim 9, wherein when the remaining amount of storage capacity is less than a predetermined amount, said storing means stores new film use history information corresponding to new individual identification information by writing over an earliest written film use history information stored in said storing means.

11. A camera according to claim 1, wherein a number of individual identification information assignable by said identification means is limited to a predetermined number, and said controlling means controls operation of the camera based on the predetermined number of individual identification information.

12. A camera according to claim 11, wherein when the number of individual identification information assigned by said identification means reaches the predetermined number, said identification means reassigns an earliest assigned individual identification information.

13. A camera according to claim 1, wherein when film use history information corresponding to the individual identification information detected by said detecting means is not stored in said storing means, said controlling means controls an operation of the camera that communicates a warning to a user of the camera.

14. A camera according to claim 13, wherein even when film use history information corresponding to the individual identification information detected by said detecting means is not stored in said storing means, said controlling means controls operation of said camera to allow a photographic operation.

15. A camera according to claim 1, further comprising means for selecting one type of plural types of film use history information stored in said storing means.

16. An apparatus usable with a film cartridge, comprising:
   identification means for assigning individual identification information to a film cartridge loaded in the apparatus;
   means for recording the individual identification information assigned by said identification means on one of the film cartridge loaded in the apparatus and film accommodated in the film cartridge;
   means for storing in the apparatus individual identification information of the film cartridge and corresponding film use history information of the film accommodated in the film cartridge, such that the corresponding film use history information is identifiable based on the individual identification information;
   means for detecting individual identification information recorded on at least one of the film cartridge loaded in the apparatus and film accommodated in the film cartridge;

means for reading out from said storing means film use history information corresponding to the individual identification information detected by said detecting means; and means for controlling operation of the apparatus in accordance with the film use history information read out from said storing means by said reading means.

17. An apparatus according to claim 16, wherein said recording means is magnetic recording means.

18. An apparatus according to claim 16, wherein said storing means is a nonvolatile memory.

19. An apparatus according to claim 16, wherein the individual identification information includes at least one of the manufacturer, the selling agent, and the model of the apparatus.

20. An apparatus according to claim 16, wherein said storing means stores as film use history information at least one of the place of a photographic operation, the date of a photographic operation, and the remaining number of frames of film accommodated in the film cartridge that are usable for photography.

21. An apparatus according to claim 16, further comprising display means for displaying information, wherein said controlling means controls operation of the apparatus so as to display information in said display means in accordance with film use history information read out from said storing means by said reading means.

22. An apparatus according to claim 16, wherein said storing means stores individual identification information and film use history information corresponding to the individual identification information, and wherein said controlling means compares the individual identification information detected by said detecting means and the individual identification information read out from said storing means by said reading means.

23. An apparatus according to claim 16, further comprising:

means for determining a state of use of the film accommodated in a film cartridge loaded in the apparatus, wherein said controlling means controls operation of the apparatus based on a determination result of said determining means.

24. An apparatus according to claim 16, wherein said storing means changes a manner of storing film use history information based on the remaining amount of storage capacity of said storing means.

25. An apparatus according to claim 24, wherein when the remaining amount of storage capacity is less than a predetermined amount, said storing means stores new film use history information corresponding to new individual identification information by writing over an earliest written film use history information stored in said storing means.

26. An apparatus according to claim 16, wherein a number of individual identification information assignable by said identification means is limited to a predetermined number, and said controlling means controls operation of the apparatus based on the predetermined number of individual identification information.

27. An apparatus according to claim 26, wherein when the number of individual identification information assigned by said identification means reaches the predetermined number, said identification means reassigns an earliest assigned individual identification information.

28. An apparatus according to claim 16, wherein when film use history information corresponding to the individual identification information detected by said detecting means is not stored in said storing means, said controlling means controls an operation of the apparatus that communicates a warning to a user of the camera.

29. An apparatus according to claim 28, wherein even when the film use history information corresponding to the individual identification information detected by said detecting means is not stored in said storing means, said controlling means controls operation of the apparatus to allow a photographic operation.

30. An apparatus according to claim 16, further comprising means for selecting one type of plural types of film use history information stored in said storing means.

* * * * *

UNITED STATES PATENT AND TRADEMARK OFFICE
CERTIFICATE OF CORRECTION

PATENT NO. : 6,243,538 B1
DATED : June 5, 2001
INVENTOR(S) : Ryoji Okuno

It is certified that error appears in the above-identified patent and that said Letters Patent is hereby corrected as shown below:

<u>Drawings,</u>
Sheet S6, "SW." should read -- SW --.

<u>Column 2,</u>
Line 45, "FIGS. 10" should read -- FIGS. 10, --.

<u>Column 5</u>
Line 49, "la" should read -- 1a --.

<u>Column 6,</u>
Line 58, "among" should be deleted.

<u>Column 8,</u>
Line 9, "letter A" should read -- letter E --.

<u>Column 11,</u>
Line 5, "film," should read -- film, or --.

<u>Column 12,</u>
Line 13, "a" should be deleted; and
Line 53, "(N = NO)" should read -- (N = No) --.

<u>Column 13,</u>
Line 63, "film," should read -- film, or --.

UNITED STATES PATENT AND TRADEMARK OFFICE
CERTIFICATE OF CORRECTION

PATENT NO.    : 6,243,538 B1
DATED         : June 5, 2001
INVENTOR(S)   : Ryoji Okuno It is certified that error appears in the above-identified patent and that said Letters Patent is hereby corrected as shown below:

Column 15,
Line 59, "la" should read -- 1a --.

Column 17,
Line 66, "sensor 31, should read -- sensor 131 --.

Signed and Sealed this

Second Day of April, 2002

Attest:

JAMES E. ROGAN
*Attesting Officer*    *Director of the United States Patent and Trademark Office*